(12) United States Patent
Hou

(10) Patent No.: US 7,552,160 B2
(45) Date of Patent: Jun. 23, 2009

(54) INTEGRATED LIFTING WAVELET TRANSFORM

(75) Inventor: Hsieh S. Hou, Rancho Palos Verdes, CA (US)

(73) Assignee: The Aerospace Corporation, El Segundo, CA (US)

(*) Notice: Subject to any disclaimer, the term of this patent is extended or adjusted under 35 U.S.C. 154(b) by 667 days.

(21) Appl. No.: 11/105,047

(22) Filed: Apr. 12, 2005

(65) Prior Publication Data

US 2006/0230090 A1 Oct. 12, 2006

(51) Int. Cl.
*G06F 17/14* (2006.01)
(52) U.S. Cl. .................................................. 708/400
(58) Field of Classification Search ................. 708/400
See application file for complete search history.

(56) References Cited

U.S. PATENT DOCUMENTS

| 6,844,830 B2 * | 1/2005 | Hashirano ................. 341/50 |
| 7,362,816 B1 * | 4/2008 | Orr ............................. 375/285 |
| 2003/0198394 A1 * | 10/2003 | Fukuhara et al. ........... 382/240 |

* cited by examiner

*Primary Examiner*—David H Malzahn
(74) *Attorney, Agent, or Firm*—Derrick Michael Reid

(57) ABSTRACT

The integrated lifting transform provides both the lossy and lossless lifting wavelet transforms while sharing the same lifting chain for either lossy data compression or lossless data compression. The lifting steps can provide a lossless compression and a lossy compression directly from lossless compression while the integer-to-integer adaptive four-stage lifting wavelet transform provides the lossless compression with improved performance.

7 Claims, 18 Drawing Sheets

FIFTH LIFTING STAGE WAVELET TRANSFORM

INCREASING INTERPOLATION

DECREASING INTERPOLATION

MAXIMAL INTERPOLATION

MINIMAL INTERPOLATION

THREE LIFTING STAGE WAVELET TRANSFORM

THREE LIFTING STAGE WAVELET TRANSFORM IMPLEMENTATION

FIRST LIFTING PIPELINE

SECOND LIFTING PIPELINE

THIRD LIFTING PIPELINE

FOURTH LIFTING STAGE WAVELET TRANSFORM

FOURTH LIFTING STAGE WAVELET TRANSFORM IMPLEMENTATION

FOURTH LIFTING PIPELINE

FIFTH LIFTING STAGE WAVELET TRANSFORM

FIFTH LIFTING STAGE WAVELET TRANSFORM IMPLEMENTATION

FIFTH LIFTING PIPELINE

ADAPTIVE LIFTING STAGE WAVELET TRANSFORM

ADAPTIVE LIFTING STAGE WAVELET TRANSFORM IMPLEMENTATION

ADAPTIVE LIFTING PIPELINE

INTEGRATED LIFTING STAGE WAVELET TRANSFORM

INTEGRATED LIFTING STAGE WAVELET TRANSFORM IMPLEMENTATION

INTEGRATED LIFTING PIPELINE

INTEGRATED LIFTING WAVELET TRANSFORM

STATEMENT OF GOVERNMENT INTEREST

The invention was made with Government support. The Government has certain rights in the invention.

REFERENCE TO RELATED APPLICATION

The present application is related to applicant's copending application entitled Fast Lifting Lossless Wavelet Transform Ser. No. 11/105,277, filed Apr. 12, 2005, by the same inventor.

The present application is related to applicant's copending application entitled Fast Adaptive Lifting Lossless Wavelet Transform Ser. No. 11/104,703, filed Apr. 12, 2005, by the same inventor.

FIELD OF THE INVENTION

The invention relates to the field of wavelet transforms. More particularly, the present invention relates to lifting methods in wavelet transforms for increased speed of data transformations.

BACKGROUND OF THE INVENTION

Since lifting method was first introduced, the lifting method has become a powerful method to perform wavelet transforms and many other orthogonal transforms. Especially for integer-to-integer wavelet transforms, the lifting method is an indispensable tool for lossless image compression. Prior work has shown that the number of lifting steps can have an impact on the transform performance. The fidelity of integer-to-integer transforms depends entirely on how well the integer-to-integer transforms approximate original wavelet transforms. The predominant source of errors in the lifting steps of the lifting method is due to the rounding off of the intermediate real result to an integer at each lifting step. Hence, a wavelet transform with a large number of lifting steps would automatically increase the approximation error. In the case of lossy compression, where a finite-precision arithmetic processor is used, the approximation error is less important because the approximation error is usually masked out by the transform coefficient quantization error. However, in the case of lossless compression, the compression performance is certainly affected by the approximation error. Consequently, the number of lifting steps in a wavelet transform is a major concern.

In conventional prior lifting methods, the arithmetic computation of a single-level and two-channel wavelet transform involves two basic filter convolutions, each of which is followed by a down-sampling operation as shown in filter equations.

$$s(n) = \sum_{i=0}^{M-1} h(i) \cdot x(2n - i)$$

$$d(n) = \sum_{i=0}^{M-1} g(i) \cdot x(2n - i)$$

In the filter equations, the term x is an input signal, s(n) is the down-sampled output from a lowpass filter h, and d(n) is a down-sampled output from the highpass filter g. For finite impulse response (FIR) filters, lowpass and highpass filters may be split, into even and odd parts defined by $h(z)=h_e(z^2)+z^{-1}h_o(z^2)$ and $g(z)=g_e(z^2)+z^{-1}g_o(z^2)$ split equations where subscript e denotes an even part and subscript o denotes an odd part. A P(z) polyphase matrix is composed of even and odd parts of the filter impulse response functions, and is a convenient way to express the wavelet transform operation. Thus, the wavelet transform can now be written as a polyphase wavelet transform matrix equation. In the polyphase wavelet transform matrix equation, P(z) is the polyphase matrix.

$$\begin{bmatrix} s(z) \\ d(z) \end{bmatrix} = P(z) \begin{bmatrix} x_e(z) \\ z^{-1}x_o(z) \end{bmatrix}$$

$$P(z) = \begin{bmatrix} h_e(z) & h_o(z) \\ g_e(z) & g_o(z) \end{bmatrix}$$

Initially, the conventional lifting method was introduced to improve the performance of wavelet transforms. In a two-channel, single-level wavelet transform, the input signal in each channel is first filtered by convolution and then down-sampled by a factor of two. That is, half of the filtered samples are not used and only the other half is used to compute the wavelet transform. The use of only half of the filtered samples is inefficient, and, therefore, downsampling is performed before the filtering in order to reduce the number of operations. The reduction in the number of operations is the basic idea behind the formulation of polyphase matrices. In the polyphase structure of the wavelet transform, the input signal is first split into even and odd parts before entering into the polyphase filters for convolution. By factoring the polyphase matrix into a product of many 2×2 elementary matrices, the lifting method may reduce the convolution operations to an algorithm involving simple multiplication and addition. Many orthogonal and biorthogonal wavelet transforms may be constructed by using some number of iterations of the lifting steps. In particular, Daubechies and Sweldens have presented a systematic analysis of factoring wavelet transforms into lifting steps. The lifting factorization asymptotically reduces the computational complexity of the wavelet transform by a factor of 2. Importantly, the lifting method is the only convenient method that yields integer wavelet coefficients for integer input. The conventional lifting method factorizes the polyphase matrix into a product of 2×2 elementary matrices and a scaling matrix at the end in the form as given by a polyphase factoring equation.

$$P(z) = \begin{bmatrix} c & 0 \\ 0 & \frac{1}{c} \end{bmatrix} \prod_{i=1}^{m} \begin{bmatrix} 1 & t_i(z) \\ 0 & 1 \end{bmatrix} \begin{bmatrix} 1 & 0 \\ p_i(z) & 1 \end{bmatrix}$$

The scalar factor c in the polyphase factoring equation is a normalization factor, usually a floating-point number. The matrix diagonal (c,1/c) in the same equation is called the scaling matrix. Each of the other elementary matrices represents a prediction or an update step. The prediction step elementary matrix $$\begin{bmatrix} 1 & 0 \\ P & 1 \end{bmatrix}$$

is of the form having 1,0 in the first row and p,1 in the second row, and for an update step elementary matrix having 1,t in the first row and 0,1 in the second row, where p and t are polynomials in z with z being the sample index. For most of the cases, the polynomials are zero or first-degree polynomials. The number of elementary matrices for prediction or update is the number of lifting steps or simply as steps. According to the conventional lifting method, the flow of a wavelet transform can thus be stated as splitting the input signal x(i) into even numbered samples x(2i) with s(i)←x(2i) and odd numbered samples x(2i+1) with d(i)←x(2i+1), lifting by the prediction step d(i)←d(i)+$Q_1(s_i)$, lifting by the update step s(i)←s(i)+$Q_2(d_i)$, and normalizing by $s_i$←$cs_i$ and $d_i$←$d_i$/c, using the scalar c, with $Q_1(s_i)$ and $Q_2(d_i)$ being linear polynomials of $s_i$ and $d_i$, respectively. The flow of an inverse wavelet transform follows the lifting steps in reverse direction. However, even when the input data are integers such as image pixels, the output data from the lifting algorithm are real numbers because of the sum of products in the prediction and update steps, and the final normalization operations. For an integer-to-integer wavelet transform, which is required for lossless data compression, the rounding of the sum of products into an integer in each of the prediction and update steps, but not the scaling factors in the normalization step. Therefore, there is a need to factor the scaling matrix into elementary lifting matrices too. In the prior methods, the scaling matrix is factored into four lifting steps as given by one of the following first, second and third scaling factorization matrices.

$$\begin{bmatrix} c & 0 \\ 0 & \frac{1}{c} \end{bmatrix} = \begin{bmatrix} 1 & c-1 \\ 0 & 1 \end{bmatrix}\begin{bmatrix} 1 & 0 \\ 1 & 1 \end{bmatrix}\begin{bmatrix} 1 & (1/c)-1 \\ 0 & 1 \end{bmatrix}\begin{bmatrix} 1 & 0 \\ -c & 1 \end{bmatrix}$$

$$\begin{bmatrix} c & 0 \\ 0 & \frac{1}{c} \end{bmatrix} = \begin{bmatrix} 1 & 0 \\ -1/c & 1 \end{bmatrix}\begin{bmatrix} 1 & c-1 \\ 0 & 1 \end{bmatrix}\begin{bmatrix} 1 & 0 \\ 1 & 1 \end{bmatrix}\begin{bmatrix} 1 & (1-c)/c \\ 0 & 1 \end{bmatrix}$$

$$\begin{bmatrix} c & 0 \\ 0 & \frac{1}{c} \end{bmatrix} = \begin{bmatrix} 1 & 0 \\ -1 & 1 \end{bmatrix}\begin{bmatrix} 1 & 1-1/c \\ 0 & 1 \end{bmatrix}\begin{bmatrix} 1 & 0 \\ c & 1 \end{bmatrix}\begin{bmatrix} 1 & 1/c^2-1/c \\ 0 & 1 \end{bmatrix}$$

Merging the first lifting step of the factorization matrices in scaling matrix with the last lifting step from the rest of wavelet factorization can be accomplished with only three extra steps that are needed to avoid scaling. For example, a simple class of wavelet transforms, such as, (2,2), (2,4), (4,2), (6,2), Haar, and (4,4) biorthogonal wavelet transforms may be factored into polyphase factoring equations. The polyphase matrix in the conventional lifting method of such wavelet transforms consists of three elementary matrix factors including one prediction step, one update step, and one scaling matrix.

$$P(z) = \begin{bmatrix} c & 0 \\ 0 & \frac{1}{c} \end{bmatrix}\begin{bmatrix} 1 & Q_2 \\ 0 & 1 \end{bmatrix}\begin{bmatrix} 1 & 0 \\ Q_1 & 1 \end{bmatrix}$$

In the polyphase matrix of (2,2) biorthogonal wavelet transform, for example, c=$\sqrt{2}$, $Q_1$=−(1+$z^{-1}$)/2, and $Q_2$=(1+z)/4. The sample index $z^{-1}$ denotes the next sample and z, the immediately preceding sample. Therefore, for (2,2) biorthogonal wavelet transform, $Q_1(s_i)$=−{(s(i)+s(i+1)}/2 and $Q_2(d_i)$={d(i)+d(i−1)}/4. Neglecting the scaling matrix, the integer-to-integer lifting process of the (2,2) biorthogonal wavelet transform comprises of one prediction and one update lifting steps. In the initial step the lifting process is to split the input samples x(i) into even numbered and odd numbered samples as denoted by $s^{(O)}(i)$ and $d^{(O)}(i)$ respectively as $s^{(O)}(i)$=x(2i) and $d^{(O)}(i)$=x(2i+1). The following prediction step is to give a new odd numbered sample as $d^{(1)}(i)$= $d^{(O)}(i)$−[($s^{(O)}(i)$+$s^{(O)}(i+1)$)/2]. The next update step is to calculate an updated even numbered sample as $s^{(1)}(i)$=$s^{(O)}(i)$+ [($d^{(1)}(i)$+$d^{(1)}(i−1)$)/4]. The square brackets [ . . . ] denotes rounding-off to the nearest integers. The value within the [ ] at the prediction step is a linear interpolation of two adjacent $s^{(O)}(i)$ and $s^{(O)}(i+1)$ values. Thus the $d^{(1)}(i)$ is the error between the odd numbered sample value, $d^{(O)}(i)$, and the linearly interpolated value of two adjacent even numbered samples.

In terms of the original input samples x(i), the $d^{(1)}(i)$ value is given by $d^{(1)}(i)$=[(−x(2i)+2x(2i+1)−x(2i+2))/2]. Also, in terms of the original samples, the updated value at the update step is obtained as $s^{(1)}(i)$=[(−x(2i−2)+2x(2i−1)+6x(2i)+2x (2i+1)−x(2i+2))/8]. These two samples, $d^{(1)}(i)$ and $s^{(1)}(i)$ are just the highpass and the lowpass outputs of the 5/3 biorthogonal wavelet transform used by the international image compression standard, JPEG 2000 for lossless image data compression.

For integer-to-integer transform, which is required in lossless data compression, the scaling matrix in the polyphase matrix can be replaced by the one of the factorization matrices, for example, the third factorization matrix to derive an expanded P(z) matrix.

$$P(z) = \begin{bmatrix} 1 & 0 \\ -1 & 1 \end{bmatrix}\begin{bmatrix} 1 & ck \\ 0 & 1 \end{bmatrix}\begin{bmatrix} 1 & 0 \\ c & 1 \end{bmatrix}\begin{bmatrix} 1 & Q_2-k \\ 0 & 1 \end{bmatrix}\begin{bmatrix} 1 & 0 \\ Q_1 & 1 \end{bmatrix}$$

In the expanded P(z) matrix, k=(c−1)/$c^2$. Therefore, the conventional lifting method disadvantageously requires five lifting steps for (2,2), (2,4), (4,2), (6,2), Haar, and (4,4) biorthogonal wavelet transforms.

The polyphase matrix of another class of wavelet transforms, such as, the fourth order Daubechies orthogonal wavelet (D4), the Sequential and Predictive (S+P), and the (1,1+1), TS, (2,10), and (2+2,2) biorthogonal wavelet transforms. The wavelet transforms consists of four elementary matrix factors including one first prediction step, one update step, one second prediction step, and one scaling matrix.

$$P(z) = \begin{bmatrix} c & 0 \\ 0 & \frac{1}{c} \end{bmatrix}\begin{bmatrix} 1 & 0 \\ Q_3 & 1 \end{bmatrix}\begin{bmatrix} 1 & Q_2 \\ 0 & 1 \end{bmatrix}\begin{bmatrix} 1 & 0 \\ Q_1 & 1 \end{bmatrix}$$

For integer-to-integer transform, which is required in lossless data compression, the scaling matrix in the polyphase matrix is replaced by one of the scaling factorization matrices. Therefore, the conventional lifting method disadvantageously requires six lifting steps for the lossless fourth-order Daubechies orthogonal wavelet (D4), S+P, and the (1,1+1), TS, (2,10), and (2+2,2) biorthogonal wavelet transforms.

The polyphase matrix of yet another class of wavelet transforms, such as, the sixth-order Daubechies (D6) orthogonal wavelet transform, and the 9/7 biorthogonal wavelet transform, that consists of five elementary matrix factors. These wavelet transforms include one first prediction step, a first update step, a second prediction step, a second update step, and a scaling matrix. The conventional lifting method disadvantageously requires seven lifting steps for the sixth order Daubechies orthogonal (D6) wavelet transform and the 9/7 biorthogonal wavelet transform.

In a second aspect of the prior art, the performance of using lifting method for lossless data compression has been relatively unpredictable. The reasons are due, firstly, to the overall rounding errors accumulated in many lifting steps that diminish the approximation power of wavelet transforms, and secondly, to the lifting scheme that is not locally adaptive to image properties. The advantage of using a wavelet transform for image data compression is the power of adapting to local properties of the pixels. In remote sensing hyperspectral data, many but not all spectral planes are well correlated. In each spectral plane, the spatial data is composed of patches of relatively smooth areas segmented by edges. The smooth areas can be well compressed by a relatively long wavelet transform with a larger number of vanishing moments. However, for the regions around edges, shorter wavelet transforms are preferable. Despite the fact that the local statistics of both the spectral and spatial data change from pixel to pixel, almost all known image data compression algorithms use only one wavelet transform for the entire dataset. For example, the current international image data compression standard, JPEG 2000, has adopted the (2,2) wavelet transform as the default standard for lossless image data compression for all still images. There is not a single wavelet filter that performs uniformly better than the others. Thus, it would be beneficial to use many types of wavelet filters based on local activities of the image. The selected wavelet transform can thus be best adapted to the content of the image locally.

The lifting method is a fast and powerful tool to implement all wavelet transforms. Especially for integer-to-integer wavelet transforms, the lifting method is an indispensable tool for lossless image compression. Many reversible integer-to-integer wavelet transforms have been evaluated for lossless image compression, but no adaptive lifting scheme has been mentioned. Edge adaptive lifting methods have switched the orders of prediction and update steps when applied to lossy image data compression. An adaptive lifting method has been used for lossless image data compression. The prediction step is the median of six predictors that were parts of the prediction filters of the biorthogonal wavelet transforms (2,2), (4,2), and (6,2), but poor compression ratio performance for the same image quality is disadvantageously expected from poor prediction image edges.

The current international image data compression standard, JPEG 2000, has adopted the (2,2) biorthogonal wavelet transform as the default standard of lossless image data compression for all still images. The primary reason for such a decision is that the (2,2) biorthogonal wavelet filter is relatively short and can closely follow the variation of local image contents. The lifting scheme of the (2,2) wavelet transform consists of one prediction step and one update step. At the prediction step, a linear interpolation of two adjacent even-numbered samples is used to get an estimate of the odd-numbered sample in the middle. FIG. 1 depicts conventional linear interpolations of four possible scenarios. In FIGS. 1A and 1B the slopes at the two adjacent even-numbered samples have the same sign, whereas in FIGS. 1C and 1D the two adjacent even-numbered samples have the opposite sign. As shown, the linear interpolation is more accurate in the former where the two slopes have the same sign than the latter where the two slopes have the opposite sign. In the latter case, a cubic interpolation would be more accurate. The estimated odd-numbered sample due to linear interpolation of two adjacent even-numbered samples is given by linear=$(s_i+s_{i+1})/2$. The estimated odd-numbered sample due to a four-point cubic interpolation of four adjacent even-numbered samples is given by cubic=$(-s_{i-1}+9s_i+9s_{i+1}-s_{i+2})/16$. The first order difference between the cubic and linear interpolated values is $\Delta(i)=(s_{i-1}-s_i-s_{i+1}+s_{i+2})/16$.

Neglecting the scaling factor, the conventional (2+2,2) integer-to-integer lifting wavelet transform comprises of one first prediction, one first update, and a second prediction lifting steps. In the initial step, the lifting process is to split the input samples x(i) into even numbered and odd numbered samples as denoted by $s^{(0)}(i)$ and $d^{(0)}(i)$ respectively as $s^{(0)}(i)=x(2i)$ and $d^{(0)}(i)=x(2i+1)$. The following first prediction step is to give a new odd numbered sample as $d^{(1)}(i)=d^{(0)}(i)-[(s^{(0)}(i)+s^{(0)}(i+1))/2]$. The next update step is to calculate an updated even numbered sample as $s^{(1)}(i)=s^{(0)}(i)+[(d^{(1)}(i)+d^{(1)}(i-1))/4]$. The following second prediction step is to give a new odd numbered sample as $d^{(2)}(i)=d^{(1)}(i)-[(s^{(1)}(i)-s^{(1)}(i-1)+s^{(1)}(i+1)-s^{(1)}(i+2))/16]$. The first three lifting steps in (2+2,2) biorthogonal wavelet, split, prediction, and update, are the same as in the conventional integer-to-integer lifting of (2,2) biorthogonal wavelet transform. Thus the predicted value at the first prediction step in the conventional (2,2) and (2+2,2) wavelets is a linear interpolated value as given by linear=$(s_i+s_{i+1})/2$. The predicted value at the second prediction step in the conventional (2+2,2) wavelet is the first order difference between the cubic and linear interpolated values, $\Delta(i)$. The first order difference is a mathematical term for commonly named difference. In terms of sample index, the operation of $\Delta(z)$ is written as $\Delta=(z-1-z^{-1}+z^{-2})/16$. At the second prediction step in wavelet (2+2,2) the estimated odd-numbered sample is the difference between cubic and linear interpolations. However, the cubic and linear interpolation difference value at the second prediction step is not good enough, because the first order difference does not take into account the sudden changes in the first update result.

In a third aspect of the prior art, the current international standard for still image compression, JPEG 2000, has two completely different default wavelet transforms, one is the 5/3 biorthogonal wavelet transform used for lossless data compression, and the other, CDF 9/7 biorthogonal wavelet transform for lossy data compression. The highpass filter coefficients of the 5/3 biorthogonal wavelet transforms, in terms of rational numbers are given by $h_1=(-1, 2, -1)/2$, and the lowpass filter, $h_0=(-1, 2, 6, 2, -1)/8$. The highpass filter coefficients of the CDF 9/7 biorthogonal wavelet transforms, in terms of rational numbers are given by $h_1=(1, 0, -9, 16, -9, 0, 1)/16$, and the lowpass filter, $h_0=(1, 0, -8, 16, 46, 16, -8, 0, 1)/64$.

Due to the completely different highpass and lowpass filter coefficients in the 5/3 and CDF 9/7 biorthogonal wavelet transforms, the polyphase matrices for the 5/3 and CDF 9/7 biorthogonal wavelet transforms must be factorized into two completely different elementary matrices. Thus, the 5/3 and CDF 9/7 biorthogonal wavelet transforms cannot be implemented using a common lifting step, and hence cannot share processor resources, as such, portion of the lossless lifting method cannot be used for the lossy lifting method. In some downlink applications communicating lossless compression data, the received compressed data must be first disadvantageously decompressed back into the original data set and then lossy compressed in order to generate a lossy compression data set for bandwidth efficient communication of images of a local communications network for broadband distribution. These and other disadvantages are solved or reduced using the invention.

SUMMARY OF THE INVENTION

An object of the invention in a first aspect is to reduce the number of lifting steps in orthogonal wavelet transforms, biorthogonal wavelet transforms, and sequential and predictive (S+P) wavelet transforms.

Another object of the invention in the second aspect is to provide a wavelet transform that accurately predicts image edges for improved compression ratio for the same image quality when predicting image edges.

Yet another object of the invention in the third aspect is to provide a lossy and lossless wavelet transform having common lifting step for conserving processing power and for provide direct compression from lossless compress data into lossy compress data.

The invention is directed to a class of wavelet transforms using lifting steps for image data compression. In the first aspect, a wavelet transform requires two fewer lifting steps by using modified lifting steps. The new lifting method reduces rounding errors incurred in the real-to-integer conversion process at each of the lifting steps. Consequently, the compression ratio is improved when the new lifting method is used for lossless image data compression. The reduction of the number of lifting steps saves memory space and signal delay. Floating-point round-off errors in each lifting step are reduced, such as, in highpass bands in the (2,2) wavelet transform for improved transform accuracy. The lifting steps for lossless image data compression provide lower bit rates for higher compression ratios.

In a second aspect, a fast adaptive lifting scheme is performed at the prediction steps on a pixel-by-pixel basis for improved prediction of image edges for improved accuracy of transformation along with an improved compression ratio. The fast adaptive lifting steps are used in integer-to-integer wavelet transforms for improving the performance of lossless data compression. The adaptation is performed on a pixel-by-pixel basis and is also suitable for multidimensional data with different local statistics of correlation. In addition, the lifting steps have reduced the overall rounding errors incurred in the real-to-integer conversion process at each of the lifting steps. As a result of improving the rounding accuracy, the local decorrelation power of wavelet transforms can thus be fully realized. The lifting steps provide for improved compression ratio in lossless compression.

In a third aspect of the invention, an integrated lifting step is constructed for lossy and lossless image data compression. Using common lifting steps, the integrated lifting method performs lossy or lossless data compression. The lifting step can provide a lossless compression and a lossy compression directly from lossless compression. The compression performance is improved by local adaptation to image statistics that varies from one pixel location to the other. The integrated lifting steps for lossy data compression performs as well as the rational 9/7 wavelet transform in JPEG 2000 standard. The integrated lifting steps improves lossless data compression ratio performance and provides functional flexibility for directly generating lossy compressed data from lossless compressed data. These and other advantages will become more apparent from the following detailed description of the preferred embodiment.

DETAILED DESCRIPTION OF THE PREFERRED EMBODIMENT

Figure 1A:
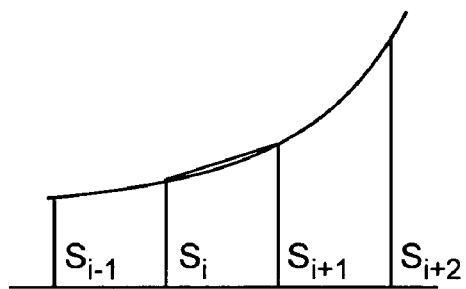
FIG. 1A is drawing of increasing interpolation for use in a prediction stage of a lifting wavelet transform.
Figure 1B:
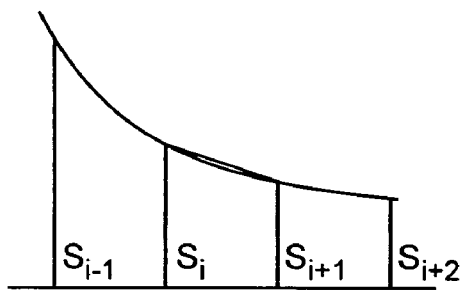
FIG. 1B is drawing of decreasing interpolation for use in a prediction stage of a lifting wavelet transform.
Figure 1C:
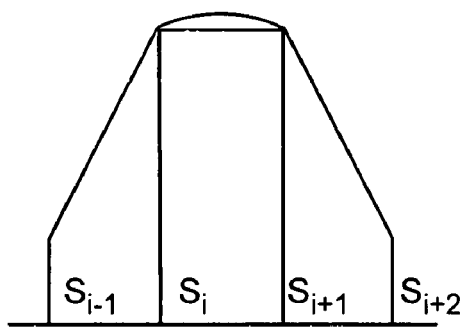
FIG. 1C is drawing of maximal interpolation for use in a prediction stage of a lifting wavelet transform.
Figure 1D:
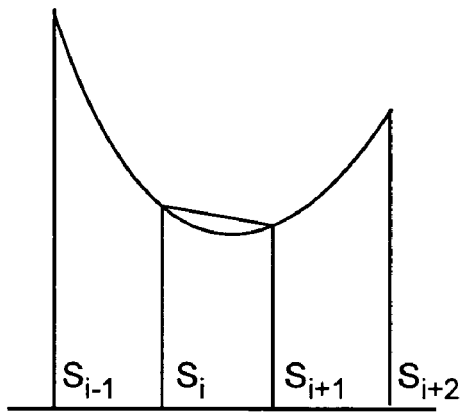
FIG. 1D is drawing of minimal interpolation for use in a prediction stage of a lifting wavelet transform.
Figure 2A:
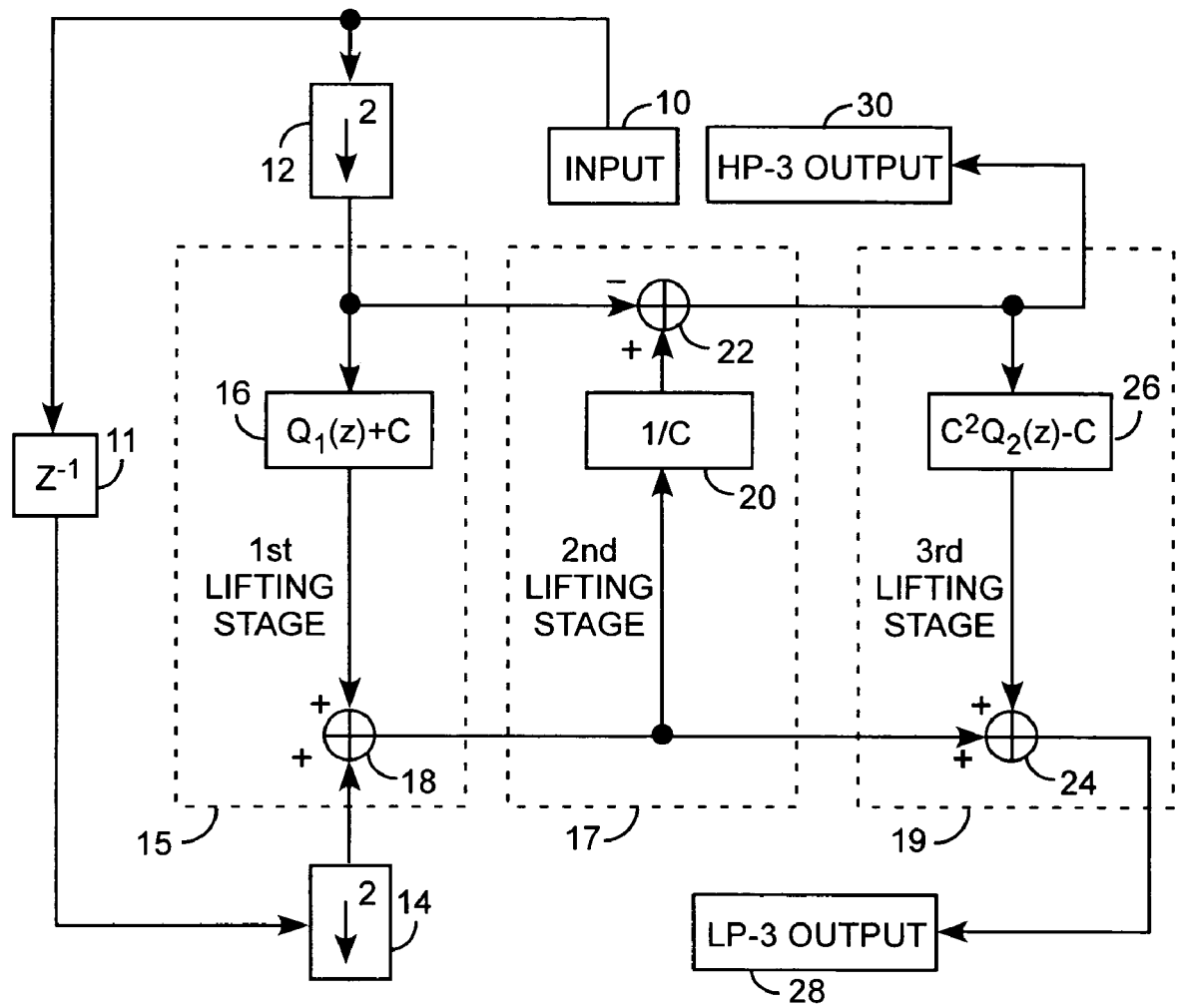
FIG. 2A is a block diagram of a three-stage lifting wavelet transform.

An embodiment of the invention is described with reference to the figures using reference designations as shown in the figures. Referring to FIG. 2A, a three lifting stage wavelet transform is used for transforming an input 10. The lifting wavelet transform performs downsampling using an even downsampler 12 for downsampling the input 10 into the even numbered samples, a $z^{-1}$ time delay 11 for delaying the input into a delayed input, and an odd downsampler 14 for downsampling the delayed input into the odd numbered samples. The downsamplers 12 and 14 downsample the input 10 into a sequence of even numbered samples and a sequence of odd numbered samples for generating consecutive even and odd numbered samples that are separated in time by the sampling time delay. The three lifting stage transforms includes three lifting stages. The first lifting stage 15 processes the odd and even numbered samples into a first lifting output. The first lifting stage 15 includes a first $[Q_1(z)+C]$ lifting process 16 for processing the even numbered samples into a first predictor output and a summer 18 for adding the first predictor output and the odd numbered samples into the first lifting output. The second lifting stage 17 for processes the even numbered samples and the first lifting output into a second lifting output being a HP-3 output 30. The second lifting stage 17 includes a second [1/C] lifting process 20 for processing the second lifting output into a compensator output and a subtractor 22 for subtracting the even numbered samples from the compensator output into the second lifting output. The third lifting stage 19 for processes the second lifting output and the first lifting output into a third lifting output being the HP-3 output 30. The third lifting stage includes a third $[C^2Q_2(z)-C]$ lifting process 26 for processing the second lifting output into a first update output and an adder 24 for adding the first update output to the second lifting output into the third lifting output that is a LP-3 output 28. In the three lifting stage transform, $[Q_1(z)+C]$ in the first lifting process is a first linear combination of the adjacent even numbered samples, (z) is an index representing consecutive samples, and $[C^2Q_2(z)-C]$ in the third lifting process is a second linear combination of the second lifting output at the index sample time z. Each of the first and second linear combinations being the sum of consecutive samples, each of which having a respective constant weighting coefficient.

The lifting method is based on the elementary matrix in the factorization of a polyphase matrix that may take on the form as $$\begin{bmatrix} -1 & 0 \\ P & 1 \end{bmatrix} \text{ or } \begin{bmatrix} -1 & t \\ 0 & 1 \end{bmatrix},$$

with the degree of p or t polynomials kept unchanged, so that the number of lifting steps for the integer-to-integer wavelet transforms may thus be reduced. This concept is used to reduce the scaling matrix to three elementary lifting steps as given in a Lemma matrix.

$$\begin{bmatrix} c & 0 \\ 0 & \frac{1}{c} \end{bmatrix} = \begin{bmatrix} 0 & 1 \\ 1 & 0 \end{bmatrix}\begin{bmatrix} 1 & 0 \\ -c & 1 \end{bmatrix}\begin{bmatrix} -1 & \frac{1}{c} \\ 0 & 1 \end{bmatrix}\begin{bmatrix} 1 & 0 \\ c & 1 \end{bmatrix}$$

In the Lemma I matrix, a proof matrix is used.

$$\begin{bmatrix} 0 & 1 \\ 1 & 0 \end{bmatrix}\begin{bmatrix} c & 0 \\ 0 & \frac{1}{c} \end{bmatrix} = \begin{bmatrix} 0 & \frac{1}{c} \\ c & 0 \end{bmatrix} = \begin{bmatrix} -1 & \frac{1}{c} \\ c & 0 \end{bmatrix}\begin{bmatrix} 1 & 0 \\ c & 1 \end{bmatrix} = \begin{bmatrix} 1 & 0 \\ -c & 1 \end{bmatrix}\begin{bmatrix} -1 & \frac{1}{c} \\ 0 & 1 \end{bmatrix}\begin{bmatrix} 1 & 0 \\ c & 1 \end{bmatrix}$$

When merging the first lifting step of the factorization matrices into a scaling matrix, the last lifting step from the rest of the wavelet factorization can be accomplished using only two extra steps to avoid scaling. However, Theorem I is a preferred way to absorb the scaling factor in the elementary lifting steps using a theorem matrix.

$$\begin{bmatrix} c & 0 \\ 0 & \frac{1}{c} \end{bmatrix}\begin{bmatrix} 1 & Q_2 \\ 0 & 1 \end{bmatrix}\begin{bmatrix} 1 & 0 \\ Q_1 & 1 \end{bmatrix} = \begin{bmatrix} c^2Q_2-c & 1 \\ 1 & 0 \end{bmatrix}\begin{bmatrix} -1 & \frac{1}{c} \\ 0 & 1 \end{bmatrix}\begin{bmatrix} 1 & 0 \\ Q_1+c & 1 \end{bmatrix}$$

The theorem matrix can be rewritten in a rewritten theorem matrix.

$$\begin{bmatrix} c & 0 \\ 0 & \frac{1}{c} \end{bmatrix}\begin{bmatrix} 1 & Q_2 \\ 0 & 1 \end{bmatrix}\begin{bmatrix} 1 & 0 \\ Q_1 & 1 \end{bmatrix} = \begin{bmatrix} 1 & c^2Q_2 \\ 0 & 1 \end{bmatrix}\begin{bmatrix} c & 0 \\ 0 & \frac{1}{c} \end{bmatrix}\begin{bmatrix} 1 & 0 \\ Q_1 & 1 \end{bmatrix}$$

Replacing the scaling matrix by the result from Lemma I to have proof of Theorem I matrices.

$$\begin{bmatrix} c & 0 \\ 0 & \frac{1}{c} \end{bmatrix}\begin{bmatrix} 1 & Q_2 \\ 0 & 1 \end{bmatrix}\begin{bmatrix} 1 & 0 \\ Q_1 & 1 \end{bmatrix} = \begin{bmatrix} 1 & c^2Q_2 \\ 0 & 1 \end{bmatrix}\begin{bmatrix} 0 & 1 \\ 1 & 0 \end{bmatrix}\begin{bmatrix} 1 & 0 \\ -c & 1 \end{bmatrix}\begin{bmatrix} -1 & \frac{1}{c} \\ 0 & 1 \end{bmatrix}\begin{bmatrix} 1 & 0 \\ c & 1 \end{bmatrix}$$

$$\begin{bmatrix} 1 & 0 \\ Q_1 & 1 \end{bmatrix} = \begin{bmatrix} 0 & 1 \\ 1 & 0 \end{bmatrix}\begin{bmatrix} 1 & 0 \\ c^2Q_2 & 1 \end{bmatrix}\begin{bmatrix} 1 & 0 \\ -c & 1 \end{bmatrix}\begin{bmatrix} -1 & \frac{1}{c} \\ 0 & 1 \end{bmatrix}\begin{bmatrix} 1 & 0 \\ c & 1 \end{bmatrix}$$

$$\begin{bmatrix} 1 & 0 \\ Q_1 & 1 \end{bmatrix} = \begin{bmatrix} 0 & 1 \\ 1 & 0 \end{bmatrix}\begin{bmatrix} 1 & 0 \\ c^2Q_2-c & 1 \end{bmatrix}\begin{bmatrix} -1 & \frac{1}{c} \\ 0 & 1 \end{bmatrix}$$

$$\begin{bmatrix} 1 & 0 \\ Q_1+c & 1 \end{bmatrix} = \begin{bmatrix} c^2Q_2-c & 1 \\ 1 & 0 \end{bmatrix}\begin{bmatrix} -1 & \frac{1}{c} \\ 0 & 1 \end{bmatrix}\begin{bmatrix} 1 & 0 \\ Q_1+c & 1 \end{bmatrix}$$

The following mathematical identities have been used in the proof of Theorem I.

$$\begin{bmatrix} 1 & 0 \\ Q_1 & 1 \end{bmatrix}\begin{bmatrix} 1 & 0 \\ Q_2 & 1 \end{bmatrix} = \begin{bmatrix} 1 & 0 \\ Q_1+Q_2 & 1 \end{bmatrix}$$

$$\begin{bmatrix} 1 & Q_1 \\ 0 & 1 \end{bmatrix}\begin{bmatrix} 1 & Q_2 \\ 0 & 1 \end{bmatrix} = \begin{bmatrix} 1 & Q_1+Q_2 \\ 0 & 1 \end{bmatrix}$$

$$\begin{bmatrix} c & 0 \\ 0 & \frac{1}{c} \end{bmatrix}\begin{bmatrix} 1 & 0 \\ Q_1 & 1 \end{bmatrix} = \begin{bmatrix} 1 & 0 \\ Q_1/c^2 & 1 \end{bmatrix}\begin{bmatrix} c & 0 \\ 0 & \frac{1}{c} \end{bmatrix}$$

$$\begin{bmatrix} c & 0 \\ 0 & \frac{1}{c} \end{bmatrix}\begin{bmatrix} 1 & Q_1 \\ 0 & 1 \end{bmatrix} = \begin{bmatrix} 1 & c^2Q_1 \\ 0 & 1 \end{bmatrix}\begin{bmatrix} c & 0 \\ 0 & \frac{1}{c} \end{bmatrix}$$

The lifting steps of a three lifting stage wavelet transform are given by Theorem I. The three lifting stage wavelet transform comprises a class of orthogonal and biorthogonal wavelet transforms. The class of three lifting stage wavelet transforms includes, but not limits to, the Haar orthogonal wavelet, the (2,2), (2,4), (4,2), (4,4), (6,2), 9/3, 13/7, and 9/7M biorthogonal wavelet transforms. The 2×2 elementary rotation operator also belongs to this class. For example, the first prediction process $Q_1(Z)$ and the first update process $Q_2(Z)$ are given respectively for the (2,2) biorthogonal wavelet transform by $Q_1=-(1+z^{-1})/2$ and $Q_2=-(1+z)/4$, and for the (4,2) biorthogonal wavelet transform by $Q_1=-(1+z^{-1})/2+(z-1-z^{-1}+z^{-2})/16$ and $Q_2=-(1+z)/4$.

In the front end, the integer input data from input buffer 10 are split into even numbered samples and odd numbered samples by the downsamplers 12 and 14. The symbol $Z^{-1}$ at 11 indicates a sample delay. The symbols of a downward arrow followed by a number 2 at 12 and 14 indicate downsampling by a factor two, namely, taking alternate samples. The blocks 11, 12, and 14 perform the same function as a one-to-two demultiplexer. Therefore, a one-to-two demultiplexer may be used in lieu of the blocks 11, 12, and 14. C is a scalar factor. The even numbered samples are linearly combined in the first predictor 16 according to the polynomial in Z, $Q_1(Z)+C$. The integer round off of the results from the first predictor are added to the corresponding odd numbered samples at the adder 18 to give the first lifting output. All the first lifting outputs are divided by a scalar C at the compensator 20. The integer round off of the compensator are used to subtract the corresponding even numbered samples at adder 22 to yield the second lifting output. The second lifting outputs are the integer highpass output at HP-3 output buffer 30. The outputs from HP-3 output buffer 30 are linearly combined at the first update 26 according to the polynomial in Z, $C(CQ_2(Z)-1)$. The integer round off of the first update output are added to the first predictor output at the adder 24 to give the integer lowpass output at LP-3 output buffer 28. The three lifting stage transform is a three lifting stage lossless wavelet transform for integer input samples. When the integer output from the LP-3 output buffer 28 and the integer output from the HP-3 output buffer 30 are used as inputs in an inverse three lifting stage lossless wavelet transform, the output data in the inverse three lifting stage lossless wavelet transform recovers the original integer input data at input buffer 10. In the forward lossless lifting wavelet transform, the round off outputs from the first predictor 16, the compensator 20, and the first update 26 are respectively used for adding at adders 18, 22, and 24. In the inverse lossless lifting wavelet transform, the round off outputs from the first predictor 16 and the first update 26 are respectively used for subtracting at adders 18 and 24. The operation of adder at 22 remains unchanged in the inverse lossless lifting wavelet transform. Finite precision arithmetic operations such as binary shifts and additions are used at the first predictor 16, the compensator 20, and the first update 26 to replace the real number multiplications and divisions.

The first predictor output and compensator output and first update output can be floating point outputs for providing lossy transform and for providing a lossless transform when the floating point outputs are rounded off into integers. For example, the first lifting process rounds off the first predictor output into integers, while the second lifting process rounds off the compensator output into integers, and while the third lifting process rounds off the first update output into integers. As such, the input data from the input buffer 10 and the third highpass output from the HP-3 output buffer 30 and the third lowpass output from the LP-3 output buffer 28 each comprise integer data during lossless compression of the input into the third highpass output and the third lowpass output.

The three-stage lifting process compresses the input of floating point values into the third highpass output and the third lowpass output during lossy compression of the input into the third highpass output and the third lowpass output. The transform compresses the input of integer values into the third highpass output and the third lowpass output during Bossy compression of the input into the third highpass output and the third lowpass output. Anyone of the first and second and third lifting processes can be integer bit shifting processes for providing lossless compression. For example, the input can be integer image data and the third highpass output and the third lowpass output are floating point numbers in JPEG lossy compression format. The input can be integer image data with the third highpass output and the third lowpass output being integer numbers in JPEG lossless compression format.

Figure 2B:
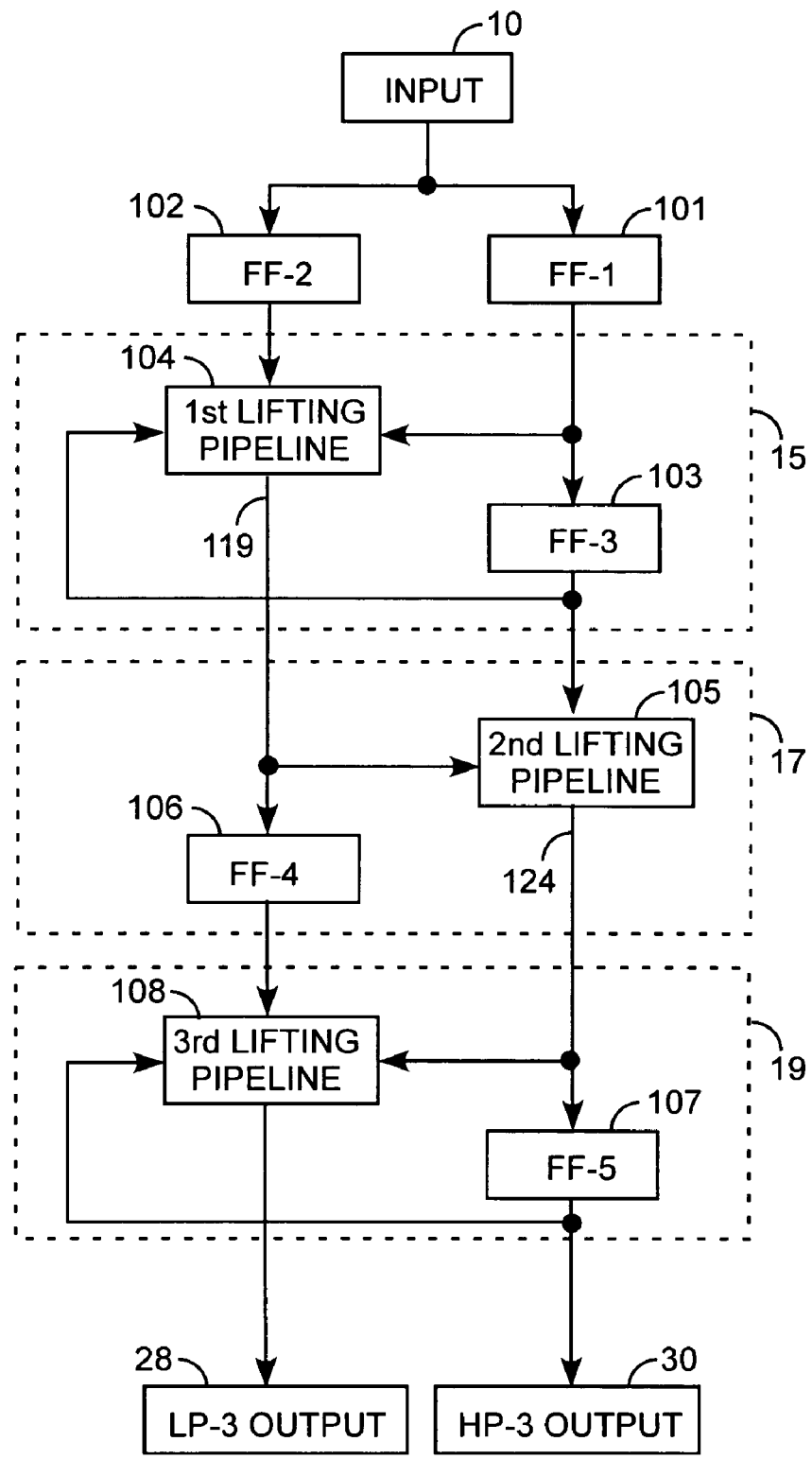
FIG. 2B is a circuit schematic of a three-stage lifting wavelet transform pipeline.

Referring to FIG. 2B, a three lifting stage wavelet transform is designed according to the signal flow depicted in FIG. 2A. The electronic system is a parallel pipeline with data flow arranged in word serial and bit parallel format. When the input data flow in at every clock edge of a two-phase clock from the input buffer 10, the input data split into two paths. The flip-flop FF-1 101 is enabled at even clock edges allowing even-numbered data flowing in. The flip-flop FF-2 102 is enabled at odd clock edges allowing odd-numbered data flowing in. Subsequently, flip-flops FF-3 103, and FF-5 107 are enabled at even clock edges. Flip-flop FF-4 106 is enabled at odd clock edges. The first lifting pipeline 104 in the first lifting stage 15 performs a prediction process by combining three consecutive input words, two even-numbered words from the outputs of FF-1 101 and FF-3 103, and one odd-numbered word from the output of FF-2 102. The second lifting pipeline 105 in the second lifting stage 17 performs a compensation process by combining two consecutive input words, one even-numbered word from the output of FF-3 103, and one odd-numbered word from the output of the first lifting pipeline 119. The third lifting pipeline 108 in the third lifting stage 19 performs an update process by combining three consecutive input words, one even-numbered word from the output of FF-5 107, one even-numbered word from the output of the second lifting pipeline 124, and one odd-numbered word from the output of FF-4 106. The LP-3 output buffer 28 latches on the output of the third lifting pipeline being the third lowpass output. The HP-3 output buffer 30 latches on the output of FF-5 107 being the third highpass output.

Figure 2C:
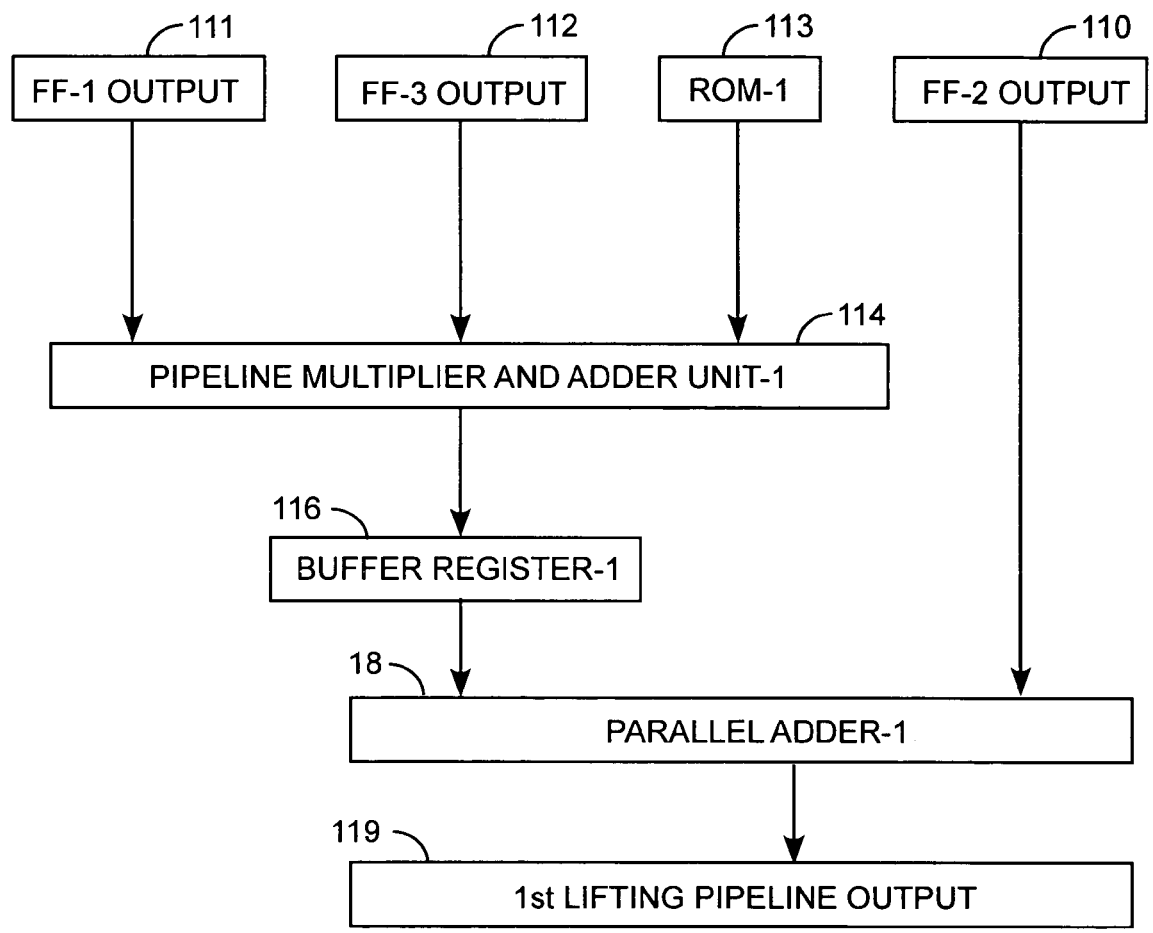
FIG. 2C is a circuit schematic of the first lifting stage pipeline.

Referring to FIG. 2C, the FF-2 output buffer 110, the parallel adder-1 18, and the first lifting pipeline output buffer 119, are all operating in odd-numbered clock phases. The FF-1 output buffer 111, the FF-3 output buffer 112, the read only memory (ROM-1) 113, and the pipeline multiplier and adder unit (PMA-1) 114, are all operating in even-numbered clock phases. The multiplying constant, (1+2*C), is stored in ROM-1 113 in canonic signed digital codes. In two's complement, the FF-3 output data from the FF-3 output buffer 112 multiplies the canonic signed digital codes of (1+2*C) in ROM-1 113 in PMA-1 114 in even-numbered clock phases. In the same PMA-1 114 the multiplied result is added to the FF-1 output data from the FF-1 output buffer 111 in two's complement. The pipeline multiplier and adder unit, composing of many levels of arrays of carry-save adders and an array of carry look-ahead adders at the output end of the unit, performs array multiplications and additions in the same unit. The number of array levels depends on the bit length of each data involved in multiplication and addition operations. The output from PMA-1 114 is piped to buffer register-1 116 at even-numbered clock edges. After finishing data loading in buffer register-1 116, the output buffer of the buffer register-1 116 is enabled at odd-numbered clock edges allowing the data to pipe out to the parallel adder-1 18. The same enable circuit is used to enable the FF-2 output buffer 110 allowing the FF-2 output data to load the parallel adder-1 18 at the same instant as the output from buffer register-1 116. The parallel adder-1 18 performs the two's complement addition and pipes out the addition result to the first lifting pipeline output buffer 119 at odd-numbered clock edges.

Figure 2D:
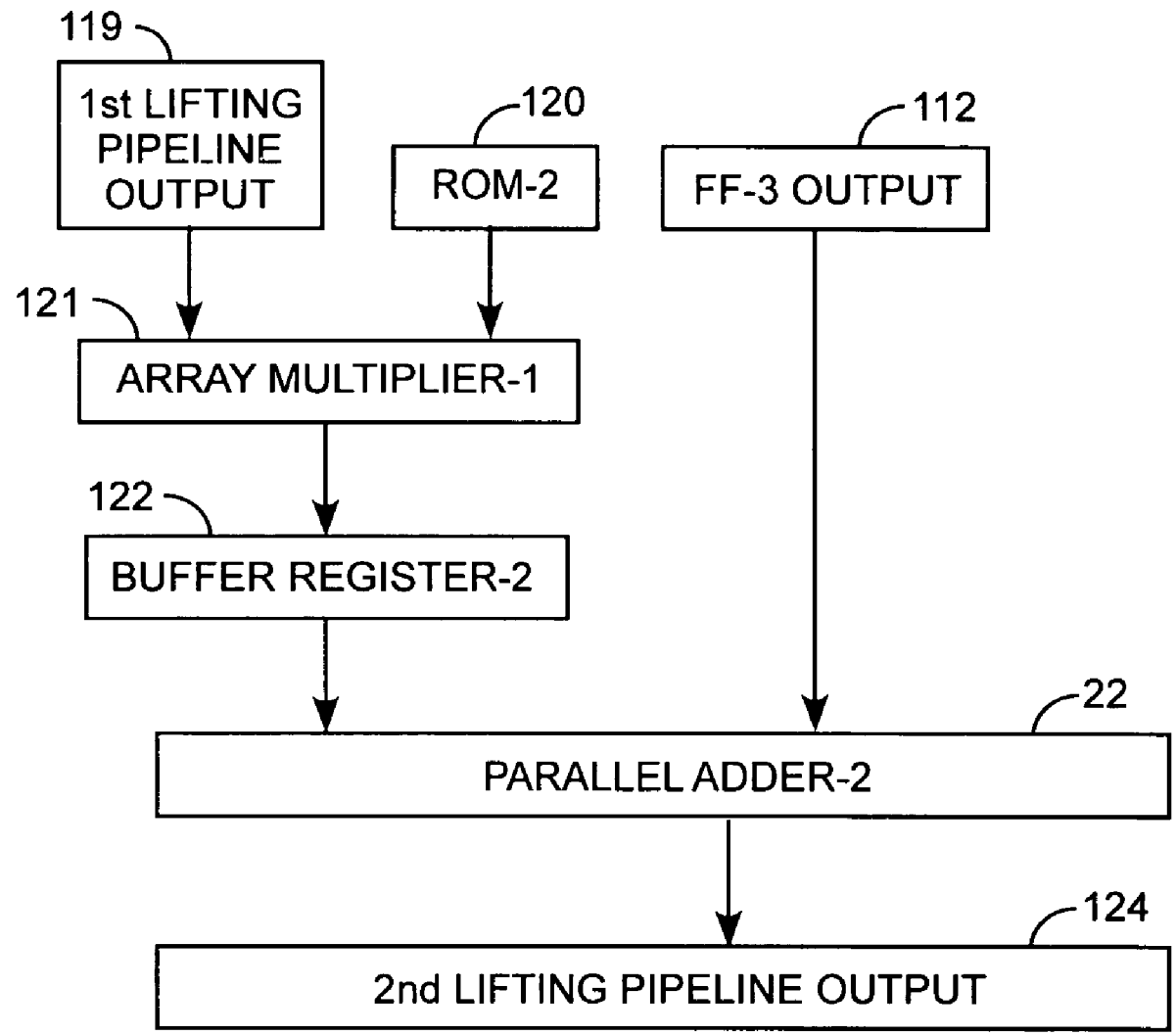
FIG. 2D is a circuit schematic of the second lifting stage pipeline.

Referring to FIG. 2D, the FF-3 output buffer 112, the parallel adder-2 22, and the second lifting pipeline output buffer 124, are operating in even-numbered clock phases. The first lifting pipeline output buffer 119, the read-only memory (ROM-2) 120, and the array multiplier-1 (AM-1) 121, are all operating in odd-numbered clock phases. The multiplying constant (1/C) is stored in ROM-2 120 in canonic signed digital codes. In two's complement, the first lifting output data from the first lifting pipeline output buffer 119 multiplies the canonic signed digital codes of (1/C) from ROM-2 120 in the array multiplier AM-1 121 at odd-numbered clock phases. The multiplication result is latched on by the buffer register-2 122 at odd-numbered clock edges, but piped out at even-numbered clock edges. Being operated in even-numbered clock phases, parallel adder-2 22 sums the FF-3 output data from the FF-3 output buffer 112 and the output data from buffer register-2 122 together, then pipes out the summation result at even-numbered clock edges to the second lifting pipeline output buffer 124.

Figure 2E:
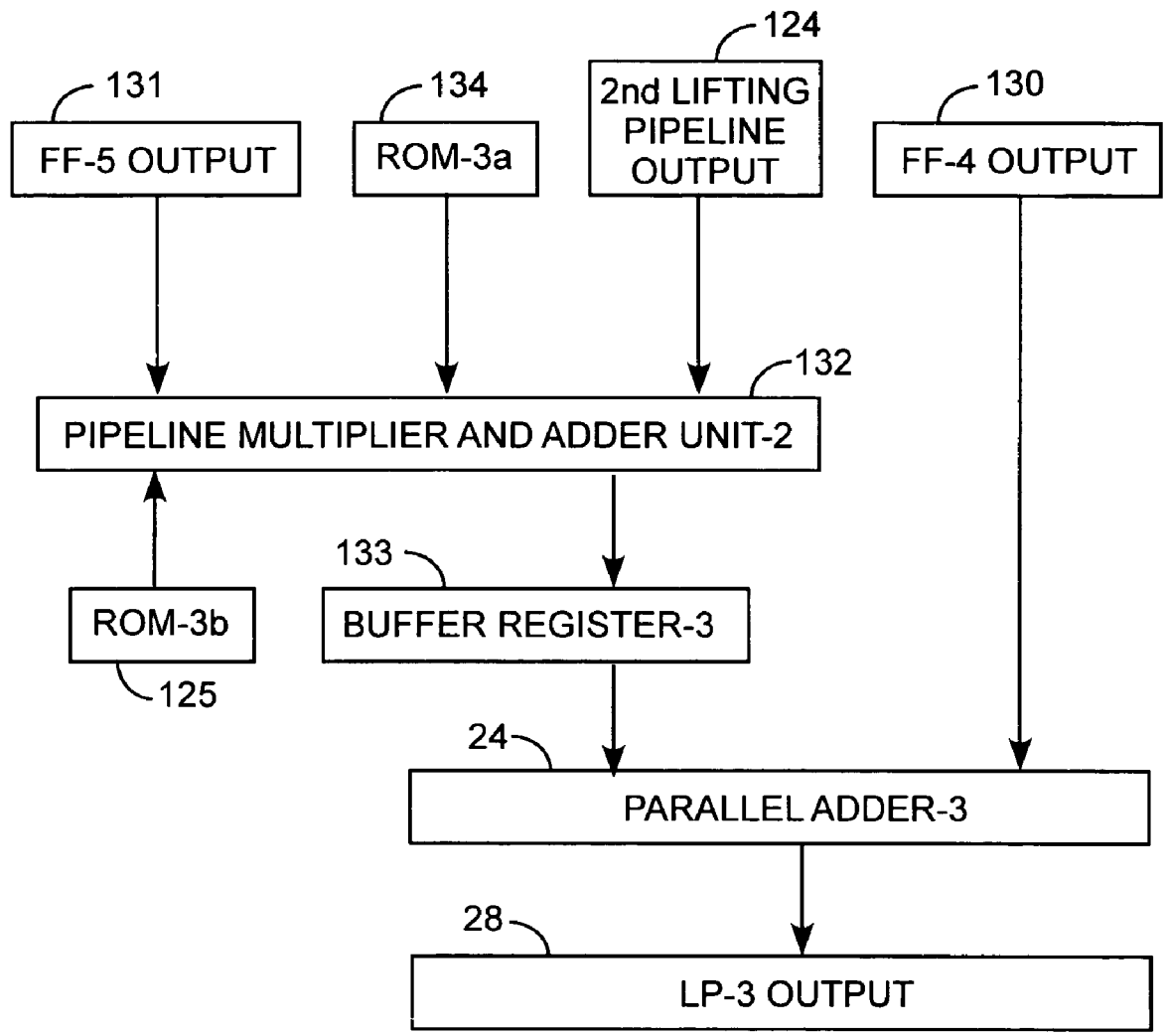
FIG. 2E is a circuit schematic of the third lifting stage pipeline.

Referring to FIG. 2E, the FF-4 output buffer 130 and the parallel adder-3 24 are operating in odd-numbered clock phases. The FF-5 output buffer 131, the read-only memory (ROM-3a) 134, the read-only memory (ROM-3b) 125, the second lifting pipeline output buffer 124, and the pipeline multiplier and adder unit-2 (PMA-2) 132, are all operating in even-numbered clock phases. The multiplying constants, ($C^2/4$) and ($C^2/4-C$) are respectively stored in ROM-3a 134 and ROM-3b 125 in canonic signed digital codes. In two's complement, the FF-5 output data from the FF-5 output buffer 131 and the second lifting output data from the second lifting pipeline output buffer 124 are multiplied to the canonic signed digital codes of ($C^2/4$) in ROM-3a 134 and ($C^2/4-C$) in ROM-3b 125 respectively by PMA-2 in even-numbered clock phases. In the same PMA-2 the two multiplied results are added together in two's complement. The summation result is latched on by buffer register-3 133 at even-numbered clock edges, but piped out at odd-numbered clock edges. Being operated on odd-numbered clock phases, parallel adder-3 24 sums the FF-4 output data from the FF-4 output buffer 130 and the output data from buffer register-3 133 together, then pipes out the summation result at odd-numbered clock edges to the LP-3 output buffer 28.

Figure 3A:
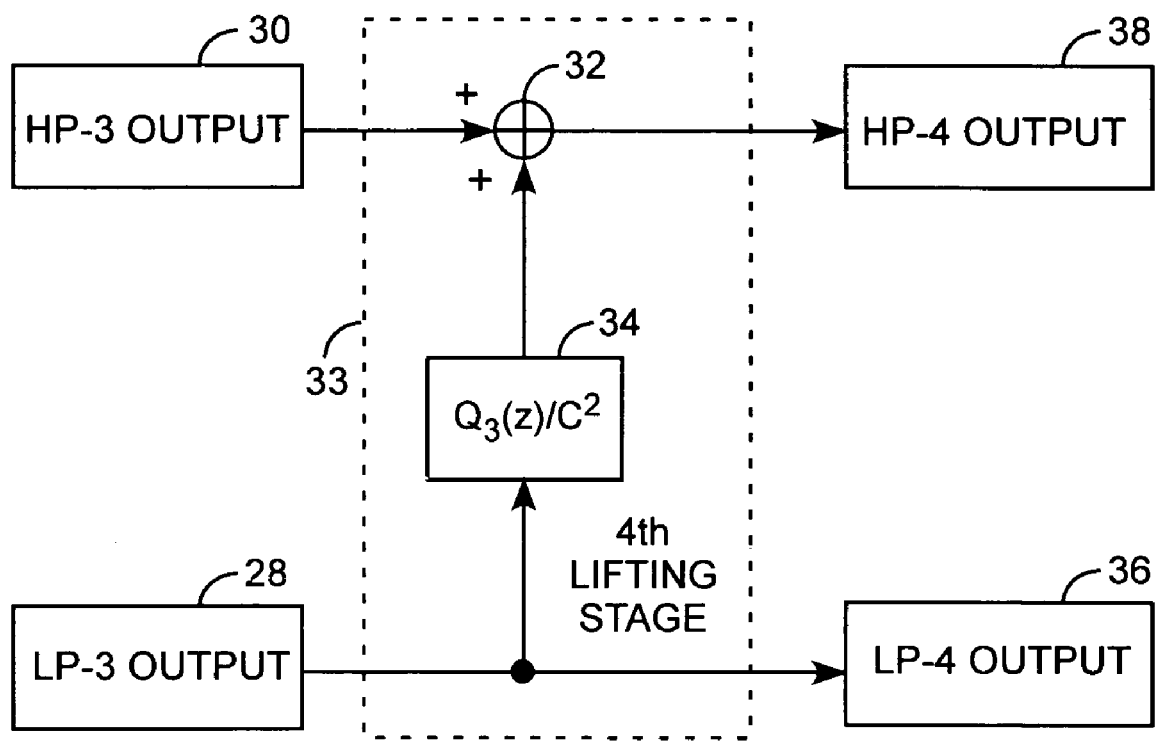
FIG. 3A is a block diagram of a fourth-stage of a lifting wavelet transform.

Referring to FIG. 3A, a fourth lifting stage 33 is used for processing the third highpass output from the HP-3 output buffer 30 and the third lowpass output from the LP-3 output buffer 28 into a fourth lifting output being the fourth highpass output stored in the HP-4 output buffer 38. The fourth lifting stage 33 includes a fourth $[Q_3(z)/C^2]$ lifting process 34 for processing the third lowpass output 28 into a second predictor output and an adder 32 for adding the second predictor output to the third highpass output 30 into the fourth lifting output being the fourth highpass output stored in the HP-4 output buffer 38. The third lowpass output 28 is also the fourth lowpass output stored in the LP-4 output buffer 36.

Using Theorem I, the polyphase matrix of a class of four lifting stage wavelet transforms is factorized into four elementary matrices as given by the four-stage polyphase factoring equation.

$$P(z) = \begin{bmatrix} 0 & 1 \\ 1 & \frac{Q_3}{c^2} \end{bmatrix} \begin{bmatrix} 1 & 0 \\ c^2 Q_2 - c & 1 \end{bmatrix} \begin{bmatrix} -1 & \frac{1}{c} \\ 0 & 1 \end{bmatrix} \begin{bmatrix} 1 & 0 \\ Q_1 + c & 1 \end{bmatrix}$$

The class of four lifting stage wavelet transforms includes, but not limit to, the fourth order Daubechies orthogonal wavelet (D4), S+P, and the (1,1+1), TS, (2,10), and (2+2,2) biorthogonal wavelet transforms. For examples, for D4, the Daubechies orthogonal wavelet transform can be defined by $c=(\sqrt{3}+1)/\sqrt{2}$, $Q_1=-\sqrt{3}$, $Q_2=\sqrt{3}/4+z^{-1}(\sqrt{3}-2)/4$, $Q_3=z$. For the (2+2,2) biorthogonal wavelet transform, $c=\sqrt{2}$, $Q_1=-(1+z^{-1})/2$, $Q_2=(1+z)/4$, and $Q_3=(z-1-z^{-1}+z^{-2})/16$.

The class of four lifting stage wavelet transforms comprises of four lifting stages. The first three lifting stages have the same structure as the three lifting stage wavelet transform. The fourth lifting stage 33 is a fourth integer-to-integer lifting stage, receiving data from the LP-3 output buffer 28 and the HP-3 output buffer 30. The data from the LP-3 output buffer 28 are linearly combined at the second predictor 34 according to the polynomial in Z, $Q_3(Z)/C^2$. The integer round off of the output of the second predictor is added to the corresponding output data from the HP-3 output buffer 30 at adder 32. The output of adder 32 is the highpass output of the fourth lifting stage 33 being stored in the HP-4 output buffer 38. The lowpass output of the fourth lifting stage being stored in the LP-4 output buffer 36 is the same as the third lowpass output from the LP-3 output buffer 28.

Figure 3B:
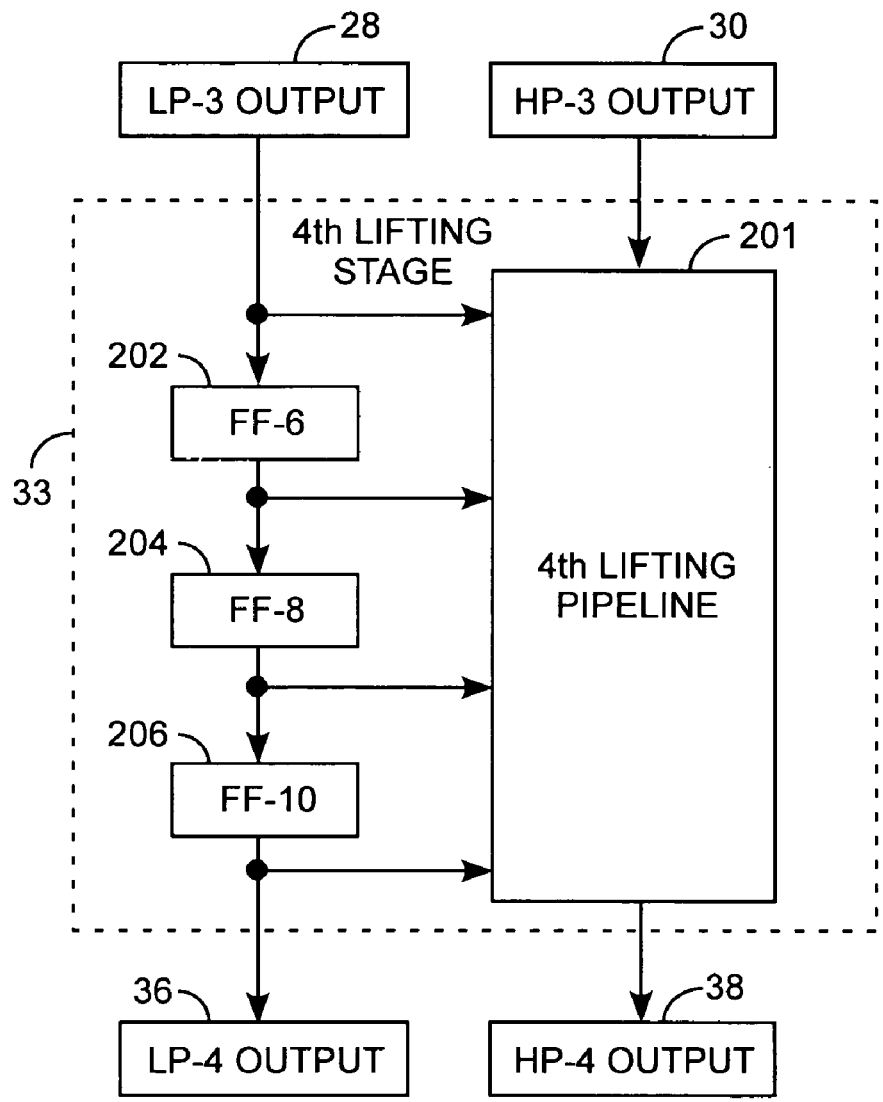
FIG. 3B is a circuit schematic of a fourth-stage of a lifting wavelet transform pipeline.

Referring to FIG. 3B, the implementation of the fourth lifting stage 33 comprises of a fourth lifting pipeline 201 and three flip-flops, FF-6 202, FF-8 204, and FF-10 206. The HP-3 output buffer 30 and the HP-4 output buffer 38 are enabled at even-numbered clock edges. The LP-3 output buffer 28, the LP-4 output buffer 36, and flip-flops FF-6 202, FF-8 204, and FF-10 206 are all enabled at odd-numbered clock edges. In word serial and bit parallel format, the third highpass output from the HP-3 output buffer 30 flows into the fourth lifting pipeline 201 during even-numbered clock phases. In the same data format the output from the fourth lifting pipeline 201 is stored in the HP-4 output buffer 38. Four consecutive data words flowing in from the LP-3 output buffer 28 are input to the fourth lifting pipeline during odd-numbered clock phases. The four consecutive words are the third lowpass output from the LP-3 output buffer 28 and outputs from flip-flops FF-6 202, FF-8 204, and FF-10 206. The third lowpass output from the LP-3 output buffer 28 after passing through flip-flops FF-6 202, FF-8 204, and FF-10 206 is input to the LP-4 output buffer 36 during odd-numbered clock phases.

Figure 3C:
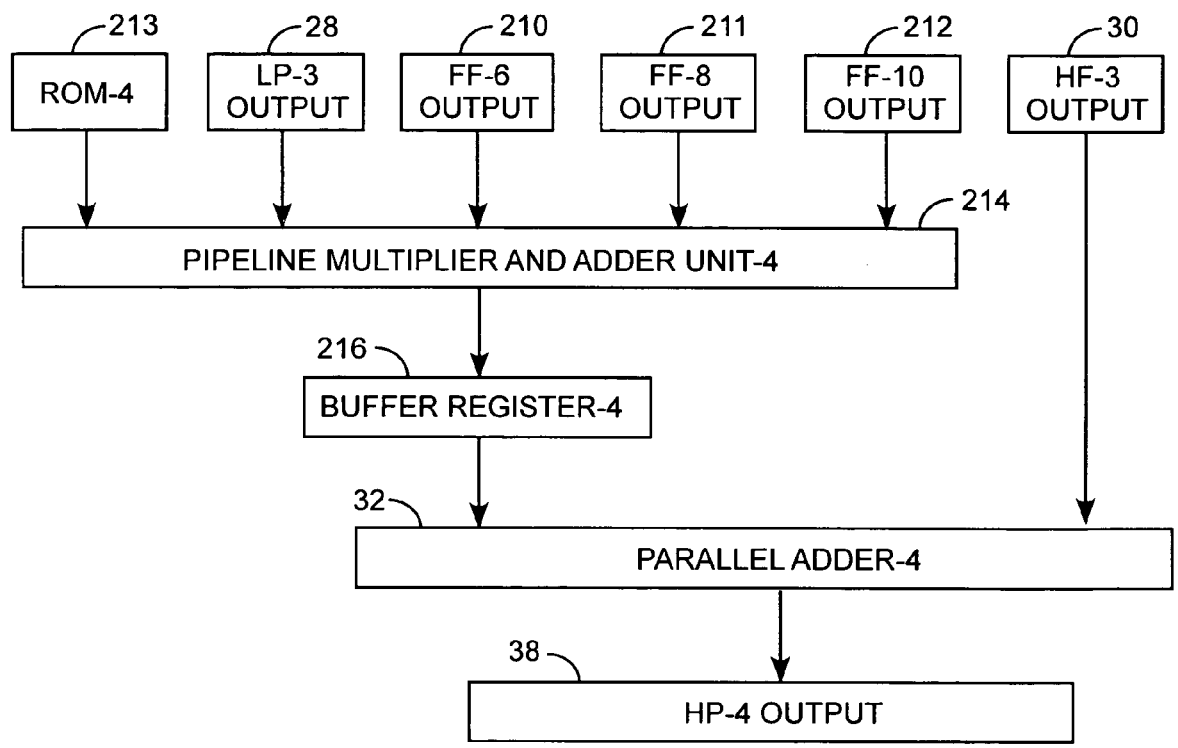
FIG. 3C is a circuit schematic of the fourth lifting stage pipeline.

Referring to FIG. 3C, the HP-3 output buffer 30 and the parallel adder-4 32 are operating in even-numbered clock phases. The LP-3 output buffer 28, the read-only memory (ROM-4) 213, the FF-6 output buffer 210, the FF-8 output buffer 211, the FF-10 output buffer 212, and the pipeline multiplier and adder unit-4 (PMA-4) 214, are all operating in even-numbered clock phases. The multiplying constant ($1/C^2$) is stored in ROM-4 213 in canonic signed digital codes. In two's complement, the output data from FF-6 output buffer 210, FF-8 output buffer 211, and FF-10 output buffer 212 and the LP-3 output data from the LP-3 output buffer 28 are added, subtracted, and multiplied to the canonic signed digital codes of ($1/C^2$) in ROM-4 213 by PMA-4 214 during odd-numbered clock phases. The result from PMA-4 214 is latched on by the buffer register-4 216 at odd-numbered clock edges, but piped out at even-numbered clock edges. Being operated in even-numbered clock phases, parallel adder-4 32 sums the HP-3 output data from the HP-3 output buffer 30 and the output data from buffer register-4 216 together, then pipes out the summation result at even-numbered clock edges to the HP-4 output buffer 38.

Figure 4A:
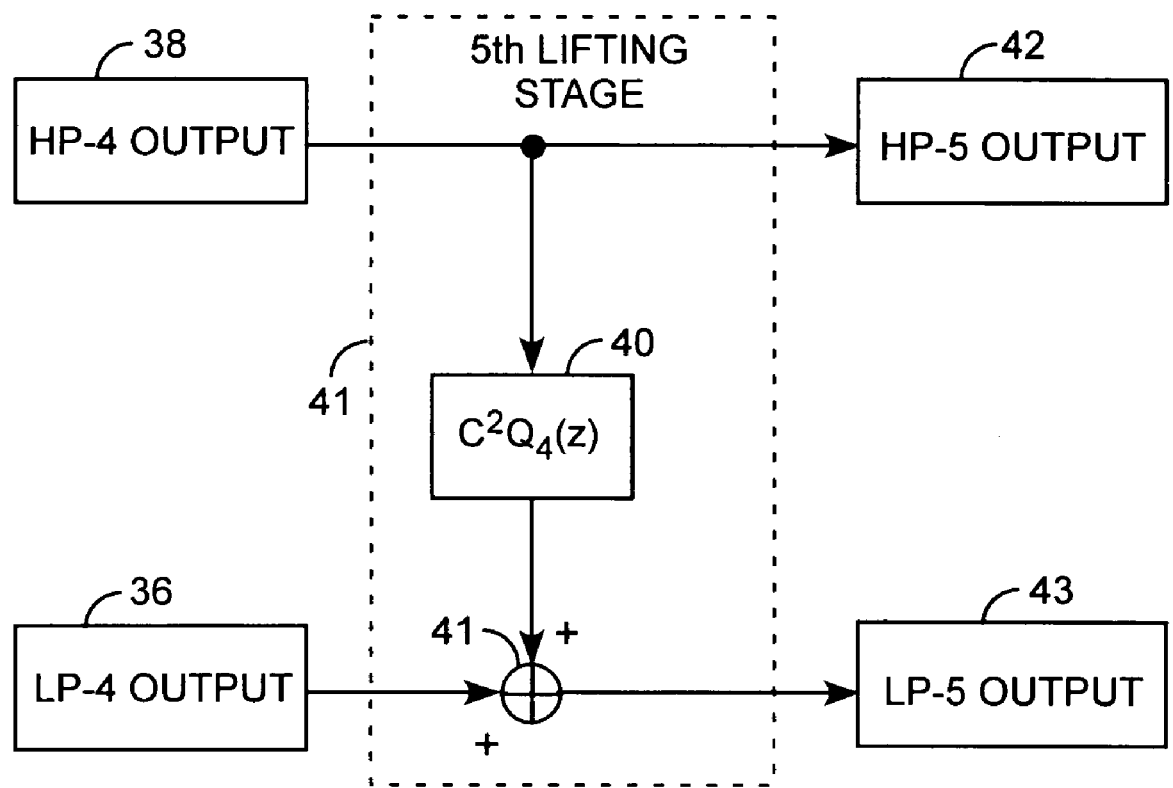
FIG. 4A is a block diagram of a fifth-stage of a lifting wavelet transform.

Referring to FIG. 4A, a fifth lifting stage 41 is for processing the fourth highpass output from the HP-4 output buffer 38 and the fourth lowpass output from the LP-4 output buffer 36 into a fifth lifting output being the fifth lowpass output at the LP-5 output buffer 43. The fifth lifting stage 41 includes a fifth $[C^2 Q_4(z)]$ lifting process 40 for processing the fourth highpass output from the HP-4 output buffer 38 into a second update output and an adder 41 for adding the second update output to the fourth lowpass output from the LP-4 output buffer 36 into the fifth lifting output being the fifth lowpass output at the LP-5 output buffer 43. The fourth highpass output from the HP-4 output buffer 38 is also the fifth highpass output in the HP-5 output buffer 42.

Using Theorem I, the polyphase matrix of a class of five-stage lifting wavelet transforms is factorized into five elementary matrices as given by the five-stage polyphase factoring equation.

$$P(z) = \begin{bmatrix} c^2 Q_4 & 1 \\ 1 & 0 \end{bmatrix} \begin{bmatrix} 1 & \frac{Q_3}{c^2} \\ 0 & 1 \end{bmatrix} \begin{bmatrix} 1 & 0 \\ c^2 Q_2 - c & 1 \end{bmatrix} \begin{bmatrix} -1 & \frac{1}{c} \\ 0 & 1 \end{bmatrix} \begin{bmatrix} 1 & 0 \\ c + Q_1 & 1 \end{bmatrix}$$

The class of five-stage wavelet transforms includes, but not limit to, the 6th-order Daubechies orthogonal wavelet (D6) and the CDF 9/7 biorthogonal wavelet transform. For example, for the CDF 9/7 biorthogonal wavelet transform, $Q_1 = \alpha(1+z^{-1})$ with $\alpha = -1.586134342$, $Q_2 = \beta(1+z)$ with $\beta = -0.05298011854$, $Q_3 = \gamma(1+z^{-1})$ with $\gamma = 0.8829110762$, and $Q_4 = \delta(1+z)$ with $\delta = 0.4435068522$ and $c = 1.149604398$.

The five lifting stage wavelet transform comprises of five lifting stages. The first four lifting stages have the same structure as the four lifting stage wavelet transforms. The fifth lifting stage 41 is an extension adding to the LP-4 output buffer 36 and the HP-4 output buffer 38. The fourth highpass output from the HP-4 output buffer 38 is linearly combined at the $C^2 Q_4(Z)$ second update process 40 using the linear polynomial $Q_4$ in time index Z. The integer round off of the output of the second update is added to the fourth lowpass output from LP-4 output buffer 36 using adder 41. The output of adder 41 is the fifth lowpass output at the LP-5 output buffer 43. The fifth highpass output at the HP-5 output buffer 42 is the same fourth highpass output from the HP-4 output buffer 38.

Figure 4B:
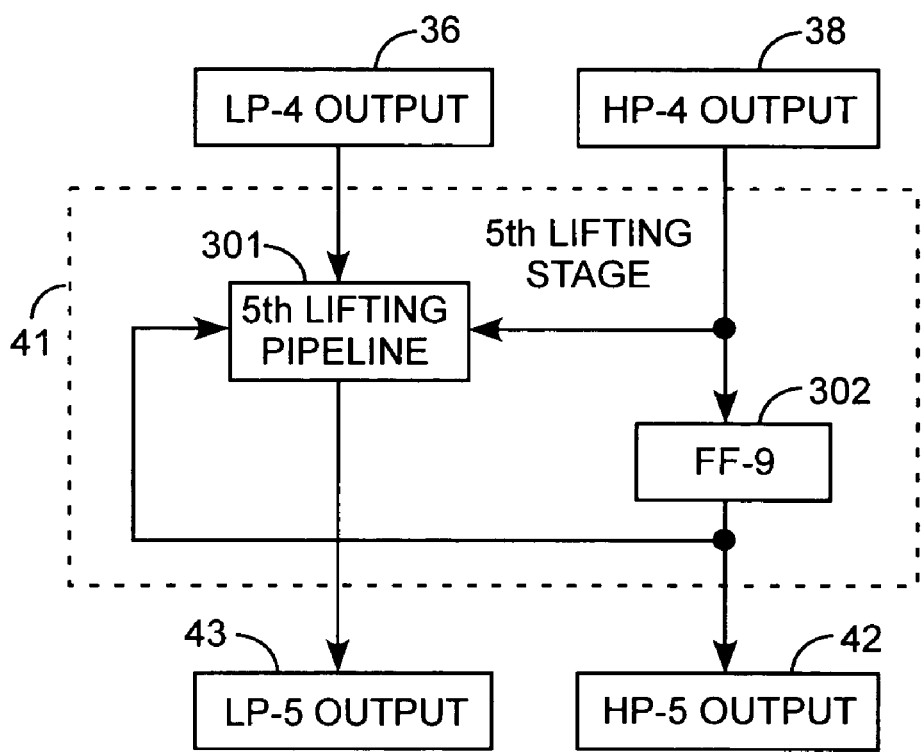
FIG. 4B is a circuit schematic of a fifth-stage of a lifting wavelet transform pipeline.

Referring to FIG. 4B, the implementation of the fifth lifting stage 41 comprises of a fifth lifting pipeline 301 and a flip-flop FF-9 302. The LP-4 output buffer 36 and the LP-5 output buffer 43 are enabled at odd-numbered clock edges. The HP-4 output buffer 38, the HP-5 output buffer 42, and flip-flops FF-9 302, are all enabled at even-numbered clock edges. In word serial and bit parallel format, the LP-4 output data flows into the fifth lifting pipeline 301 during odd-numbered clock phases. In the same data format the output from the fifth lifting pipeline 301 is stored in the LP-5 output buffer 43. Two consecutive data words flowing out from the HP-4 output buffer 38 are input to the fifth lifting pipeline 301 during even-numbered clock phases. The two consecutive data words are output from the HP-4 output buffer 38 and the output from flip-flop FF-9 302. The data from the HP-4 output buffer 38 after passing through flip-flop FF-9 302 is input to the HP-5 output buffer 42 during even-numbered clock phases.

Figure 4C:
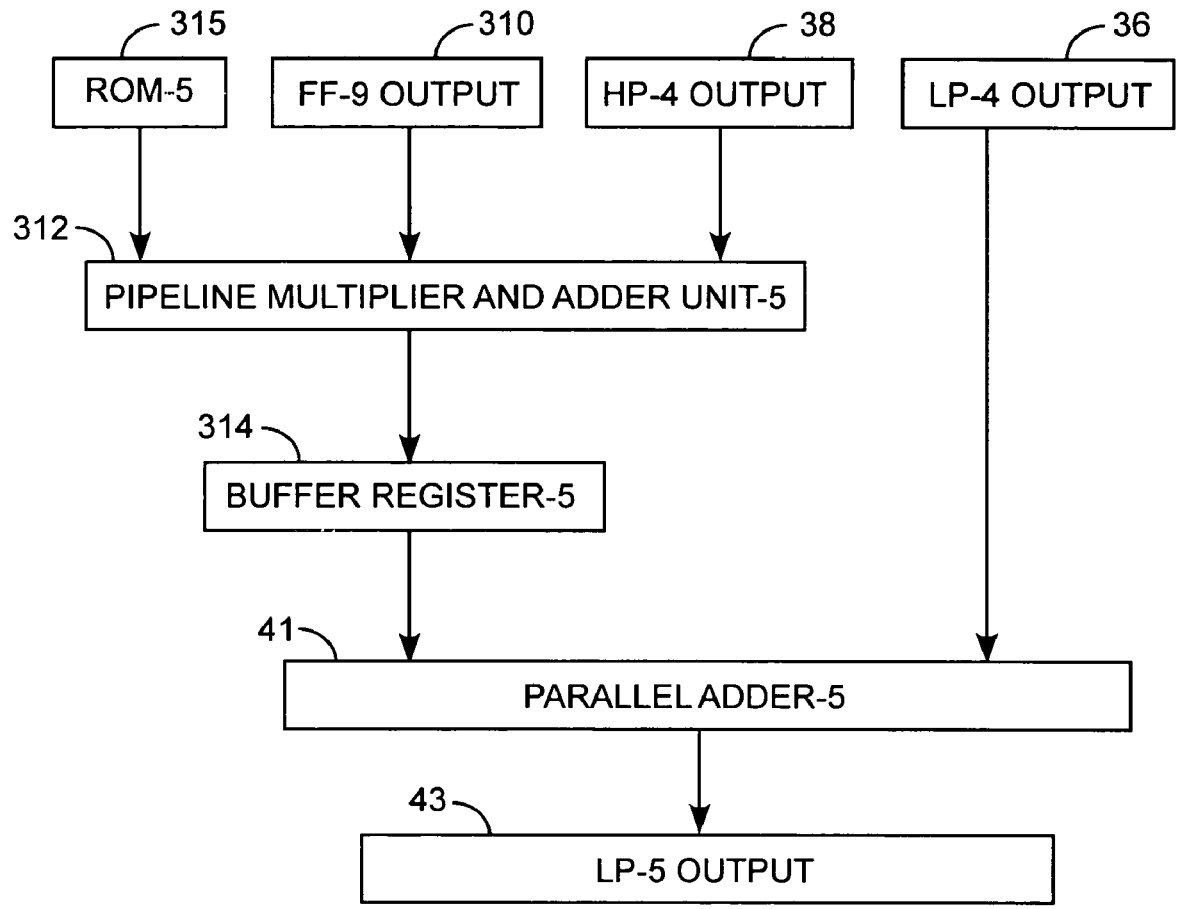
FIG. 4C is a circuit schematic of the fifth lifting stage pipeline.

Referring to FIG. 4C, the LP-4 output buffer 36 and the parallel adder-5 41 are operating in odd-numbered clock phases. The FF-9 output buffer 310, the read-only memory (ROM-5) 315, the HP-4 output buffer 38, and the pipeline multiplier and adder unit-5 (PMA-5) 312, are all operating in even-numbered clock phases. The multiplying constant $(k*C^2)$ is stored in ROM-5 315 in canonic signed digital codes. In two's complement, the FF-9 output data from the FF-9 output buffer 310 and the HP-4 output data from the HP-4 output buffer 38 are added together in PMA-5 312. In the same PMA-5 312 the summation result is multiplied to the canonic signed digital codes of $(k*C^2)$ from ROM-5 in even-numbered clock phases. The multiplication result is latched on by the buffer register-5 314 at even-numbered clock edges, but piped out at odd-numbered clock edges. Being operated in odd-numbered clock phases, parallel adder-5 41 sums the LP-4 output data from the LP-4 output buffer 36 and the output data from buffer register-5 314 together, then pipes out the summation result at odd-numbered clock edges to the LP-5 output buffer 43.

To compare the performance of the lifting method to the conventional lifting method for integer-to-integer wavelet transform, the (2,2) wavelet transform is used as an example. Both the integer-to-integer three-stage lifting and the conventional integer-to-integer lifting of the (2,2) biorthogonal wavelet transform were applied to two-dimensional images and compared them to that using the floating point (2,2) wavelet transform. The overall real-to-integer round-off errors of the transform coefficients in the highpass and highpass quadrant were compared. Ten gray-scaled images from various sources have been used in the comparison. The results are listed in the Overall Round-Off Mean-Square Error Table.

| Overall Round-Off Mean-Square Error Table | | |
|---|---|---|
| Images | Conventional | 3-Stage Lifting |
| Lena | 3.52 | 0.89 |
| Barb1 | 13.86 | 0.91 |
| Goldhill | 5.42 | 0.91 |
| Boats | 4.70 | 0.85 |
| Peppers | 4.71 | 0.90 |
| Boy | 4.95 | 0.74 |
| Weather | 3.60 | 0.88 |
| Newrv | 4.29 | 0.89 |
| Newrr | 1.31 | 0.77 |
| Mount | 1.56 | 0.87 |

The integer-to-integer three-stage lifting of (2,2) biorthogonal wavelet transform not only saves two lifting steps than the conventional integer-to-integer lifting of (2,2) biorthogonal wavelet transform, but also results in better accuracy for approximating the floating point (2,2) biorthogonal wavelet transform. As expected, using for lossless image data compression, the integer-to-integer three-stage lifting of (2,2) biorthogonal wavelet transform outperforms the JPEG 2000 international image compression standard that uses the conventional integer-to-integer lifting of (2,2) biorthogonal wavelet transform for lossless image compression. In terms of bit-rates, the comparison of lossless compression results is listed in the Bit-Rate Comparison of Lossless Compression of 8-bit Images Table.

| Bit-Rate Comparison of Lossless Compression of 8-bit Images Table | | | |
|---|---|---|---|
| Images | JPEG2000 | 3-stage Lifting | Difference |
| Balloon | 3.50 | 3.20 | 0.30 |
| Barb1 | 5.80 | 4.65 | 1.15 |
| Barb2 | 6.65 | 5.13 | 1.52 |
| Board | 4.17 | 3.90 | 0.23 |
| Boats | 5.34 | 4.16 | 1.18 |
| Goldhill | 5.76 | 4.81 | 0.95 |
| Hotel | 5.56 | 4.82 | 0.74 |
| Girl | 4.76 | 4.15 | 0.61 |
| Lena | 5.30 | 4.36 | 0.94 |
| Peppers | 5.33 | 4.65 | 0.68 |
| Tokyo | 7.01 | 5.34 | 1.67 |
| Zelda | 5.02 | 4.03 | 0.99 |

The comparisons of lossless compression performance have also done on 12-bits per pixel images. The results are listed in the Bit-Rate Comparison of Lossless Compression of 12-bit Images Table.

| Bit-Rate Comparison of Lossless Compression of 12-bit Images Table | | | |
|---|---|---|---|
| Images | JPEG2000 | 3-Stage Lifting | Improvement |
| High Resolution | 7.11 | 6.92 | 0.19 |
| Moffet | 9.36 | 8.45 | 0.91 |
| Ames | 9.70 | 8.64 | 1.06 |

Both the Bit-Rate Comparison of Lossless Compression of 8-bit Images Table and the Bit-Rate Comparison of Lossless Compression of 12-bit Image Table show that the integer-to-integer three-stage lifting of the (2,2) biorthogonal wavelet transform provides improved compression ratios than the JPEG 2000 that uses the conventional integer-to-integer lifting of the (2,2) biorthogonal wavelet transform for lossless compression.

Figure 5A:
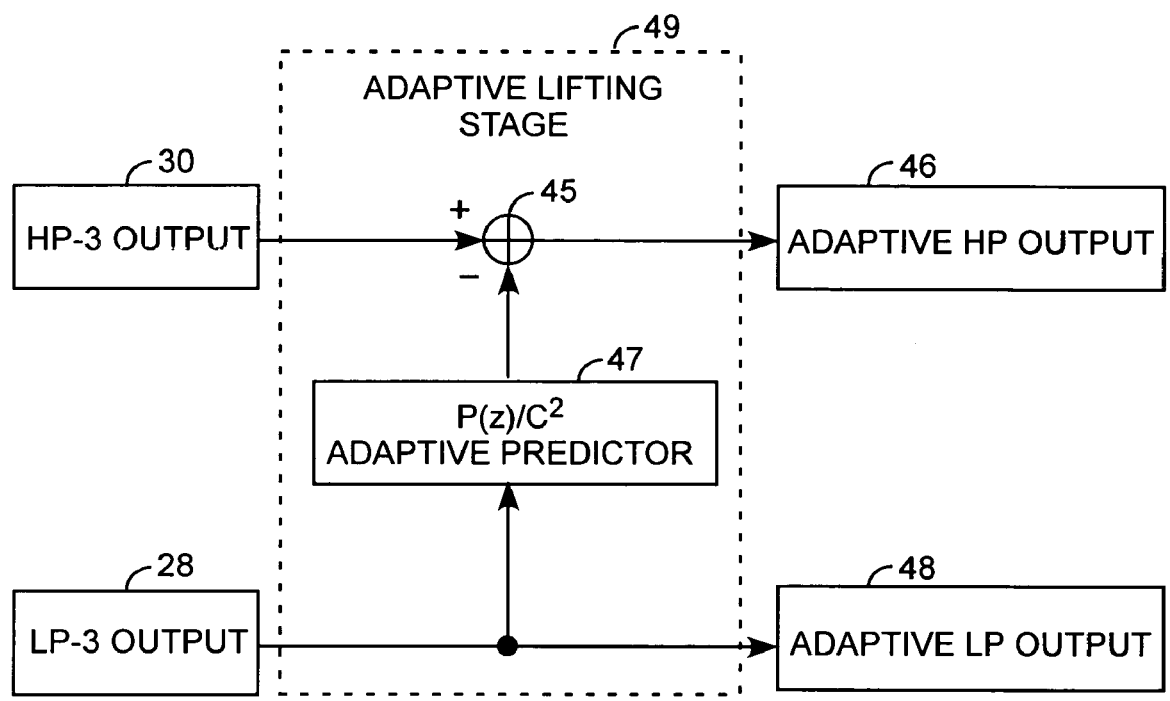
FIG. 5A is a block diagram of an adaptive stage of a lifting wavelet transform.

Referring to FIG. 5A, an adaptive lifting wavelet transform is used for transforming an input into an adaptive highpass output and an adaptive lowpass output. The adaptive lifting wavelet transform is an extension of the three-stage lifting wavelet transform that transforms an input into a third highpass output and a third lowpass output. An adaptive lifting stage 49 is used for processing the third highpass output from the HP-3 output buffer 30 and the third lowpass output from the LP-3 output buffer 28 into an adaptive highpass output at the adaptive HP output buffer 46 and an adaptive lowpass output at the adaptive LP output buffer 48. The adaptive lifting stage 49 includes a $[P(z)/C^2]$ adaptive predictor process 47 for providing an adaptive predictor output from the third lowpass output. The adaptive lifting stage 49 also includes an adder 45 for subtracting the adaptive predictor output from the third highpass output into the adaptive highpass output at the adaptive HP output buffer 46. The third lowpass output from the LP-3 output buffer 28 is the adaptive lowpass output at the adaptive LP output buffer 48.

In the adaptive predictor process, the sum of one quarter of a third order difference and the first order difference between the cubic and linear interpolated values is used as a refined prediction process. The first order difference between the cubic and linear interpolated values, $\Delta(i)$, is defined as $\Delta=(z-1-z^{-1}+z^{-2})/16$. A second order difference is the difference between two consecutive first order differences, and a third order difference is the difference between two consecutive second order differences. $E(\Delta)$ is defined as one quarter of the third order difference. To be precise, $E(\Delta)$ is given by $E(\Delta)=[-\Delta(i-1)+2\Delta(i)-\Delta(i+1)]/4$ and $\Delta=(z-1-z^{-1}+z^{-2})$. Therefore, the adaptive predicted value $P(z)$ is given by $P(z)=\Delta+E(\Delta)=\Delta(i)+[-\Delta(i-1)+2\Delta(i)-\Delta(i+1)]/4$.

The adaptive four-stage integer-to-integer lifting transform of (2+2,2) biorthogonal wavelet transform comprises of four lifting stages. The first three lifting stages have the same structure as the three-stage lifting wavelet transforms. The inputs to the adaptive fourth lifting stage are the third lowpass output data from the LP-3 output buffer 28 and the third highpass output data output from the HP-3 output buffer 30. The third lowpass output data are linearly combined at the adaptive predictor 47 according to the polynomial in z, $[P(z)/C^2]$. The integer round off of the output of the adaptive predictor is added to the corresponding HP-3 output data at adder 45. The output of adder 45 is the highpass output of the adaptive lifting stage at the adaptive HP output buffer 46. The lowpass output of the adaptive lifting stage at the adaptive LP output buffer 48 is the same as the third lowpass output data from the LP-3 output buffer 28. The adaptive four-stage lifting transform is operated based on pixel-to-pixel adaptation and there is no bookkeeping overhead.

Figure 5B:
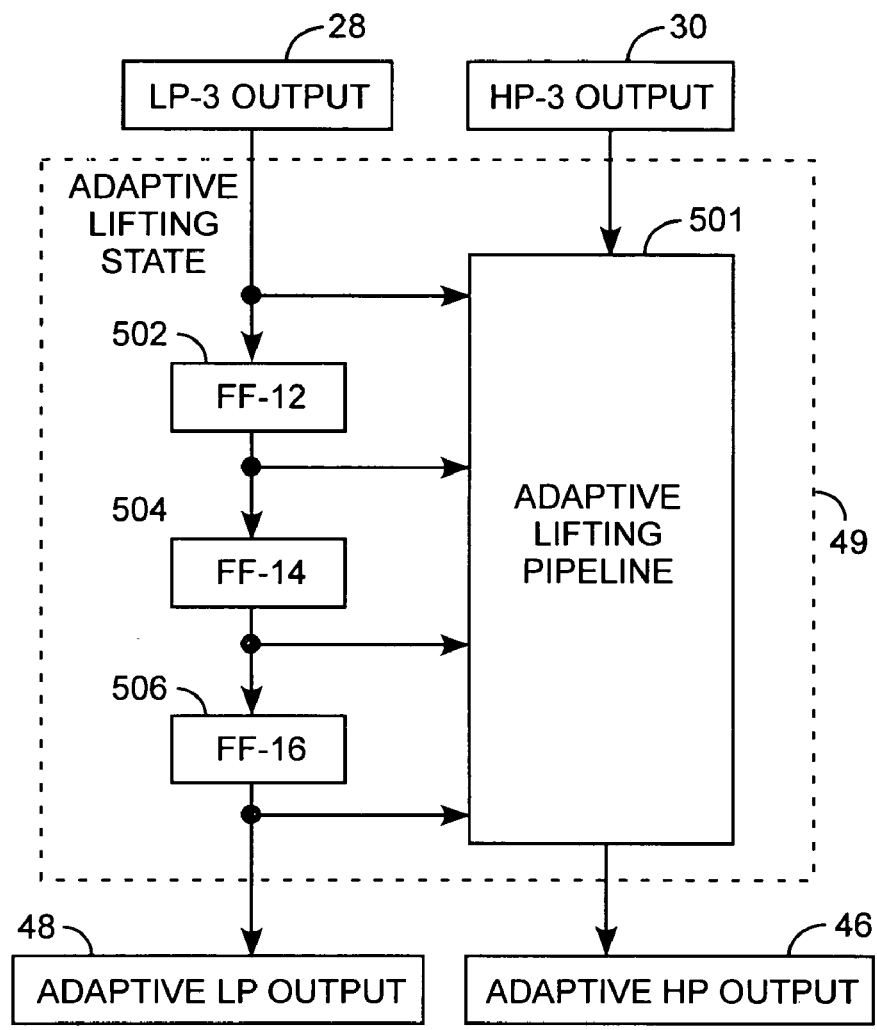
FIG. 5B is a circuit schematic of an adaptive stage of a lifting wavelet transform pipeline.

Referring to FIG. 5B, the implementation of the adaptive lifting stage 49 comprises of an adaptive lifting pipeline 501 and three flip-flops, FF-12 502, FF-14 504, and FF-16 506. The HP-3 output buffer 30 and the adaptive HP output buffer 46 are enabled at even-numbered clock edges. The LP-3 output buffer 28, the adaptive LP output buffer 48, and flip-flops FF-12 502, FF-14 504, and FF-16 506 are all enabled at odd-numbered clock edges. In word serial and bit parallel format, the third highpass output from the HP-3 output buffer 30 flows into the adaptive lifting pipeline 501 during even-numbered clock phases. In the same data format the output from the adaptive lifting pipeline 501 is stored in the adaptive HP output buffer 46. Four consecutive data words flowing in from the LP-3 output buffer 28 are inputs to the adaptive lifting pipeline 501 during odd-numbered clock phases. The four consecutive words are output from the LP-3 output buffer 28 and the outputs from flip-flops FF-12 502, FF-14 504, and FF-16 506. The third lowpass output data from the LP-3 output buffer 28 after passing through flip-flops FF-12 502, FF-14 504, and FF-16 506 is input to the adaptive LP output buffer 48 during odd-numbered clock phases.

Figure 5C:
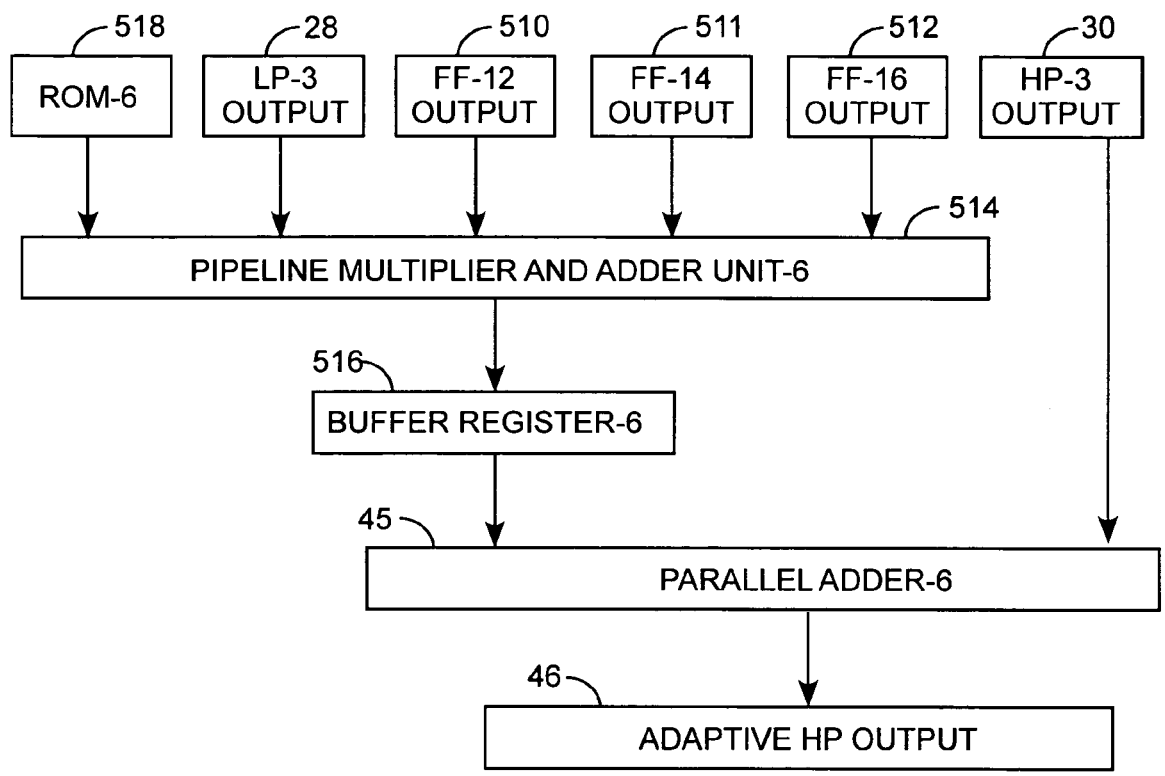
FIG. 5C is a circuit schematic of the adaptive lifting stage pipeline.

Referring to FIG. 5C, the HP-3 output buffer 30 and the parallel adder-6 45 are operating in even-numbered clock phases. The LP-3 output buffer 28, the read-only memory (ROM-6) 518, the FF-12 output buffer 510, the FF-14 output buffer 511, the FF-16 output buffer 512, and the pipeline multiplier and adder unit-6 (PMA-6) 514, are all operating in even-numbered clock phases. The multiplying constant $(1/C^2)$ is stored in ROM-6 518 in canonic signed digital codes. In two's complement, the output data from FF-12 output buffer 510, FF-14 output buffer 511, and FF-16 output buffer 512, and the third lowpass output data from the LP-3 output buffer 28 are added, shifted, subtracted, multiplied to the canonic signed digital codes of $(1/C^2)$ in ROM-6 518 by the PMA-6 514 during odd-numbered clock phases. The result from PMA-6 514 is latched on by the buffer register-6 516 at odd-numbered clock edges, but piped out at even-numbered clock edges. Being operated on even-numbered clock phases, parallel adder-6 45 sums the third highpass output data from the HP-3 output buffer 30 and the output data from buffer register-6 516 together, then pipes out the summation result at even-numbered clock edges to the adaptive HP output buffer 46.

Using for lossless image data compression, the integer-to-integer adaptive four-stage lifting of (2+2,2) biorthogonal wavelet transform outperforms the JPEG 2000 international image compression standard that uses the conventional integer-to-integer lifting of (2,2) biorthogonal wavelet transform for lossless image compression. In terms of bit-rates, the comparison of lossless compression results is listed in the Bit-Rate Comparison of Adaptive Compression of 8-bit Images Table.

| Bit-Rate Comparison of Adaptive Compression of 8-bit Images Table | | | |
|---|---|---|---|
| Images | JPEG2000 | Adaptive Lifting | Improvement |
| Balloon | 3.50 | 3.19 | 0.31 |
| Barb | 15.80 | 4.51 | 1.29 |

-continued

Bit-Rate Comparison of Adaptive Compression of 8-bit Images Table

| Images | JPEG2000 | Adaptive Lifting | Improvement |
| --- | --- | --- | --- |
| Barb | 26.65 | 5.09 | 1.56 |
| Board | 4.17 | 3.87 | 0.30 |
| Boats | 5.34 | 4.12 | 1.22 |
| Goldhill | 5.76 | 4.82 | 0.94 |
| Hotel | 5.56 | 4.82 | 0.74 |
| Girl | 4.76 | 4.06 | 0.70 |
| Lena | 5.30 | 4.33 | 0.97 |
| Peppers | 5.33 | 4.65 | 0.68 |
| Tokyo | 7.01 | 5.20 | 1.81 |
| Zelda | 5.02 | 4.00 | 1.02 |

The comparisons of adaptive compression performance have also been performed on 12-bits per pixel images. The results are listed in the Bit-Rate Comparison of Adaptive Compression of 12-bit Images Table.

Bit-Rate Comparison of Adaptive Compression of 12-bit Images Table

| Images | JPEG2000 | Adaptive Lifting | Improvement |
| --- | --- | --- | --- |
| High Resolution | 7.11 | 6.76 | 0.35 |
| Moffet | 9.36 | 8.39 | 0.97 |
| Ames | 9.70 | 8.58 | 1.12 |

Both the Bit-Rate Comparison of Adaptive Compression of 8-bit Images Table and the Bit-Rate Comparison of Adaptive Compression of 12-bit Image Table show that the integer-to-integer adaptive four-stage lifting of the (2+2,2) biorthogonal wavelet transform gives ever better compression ratio than the JPEG 2000 that uses the conventional integer-to-integer lifting of the (2,2) biorthogonal wavelet transform for lossless compression.

Figure 6A:
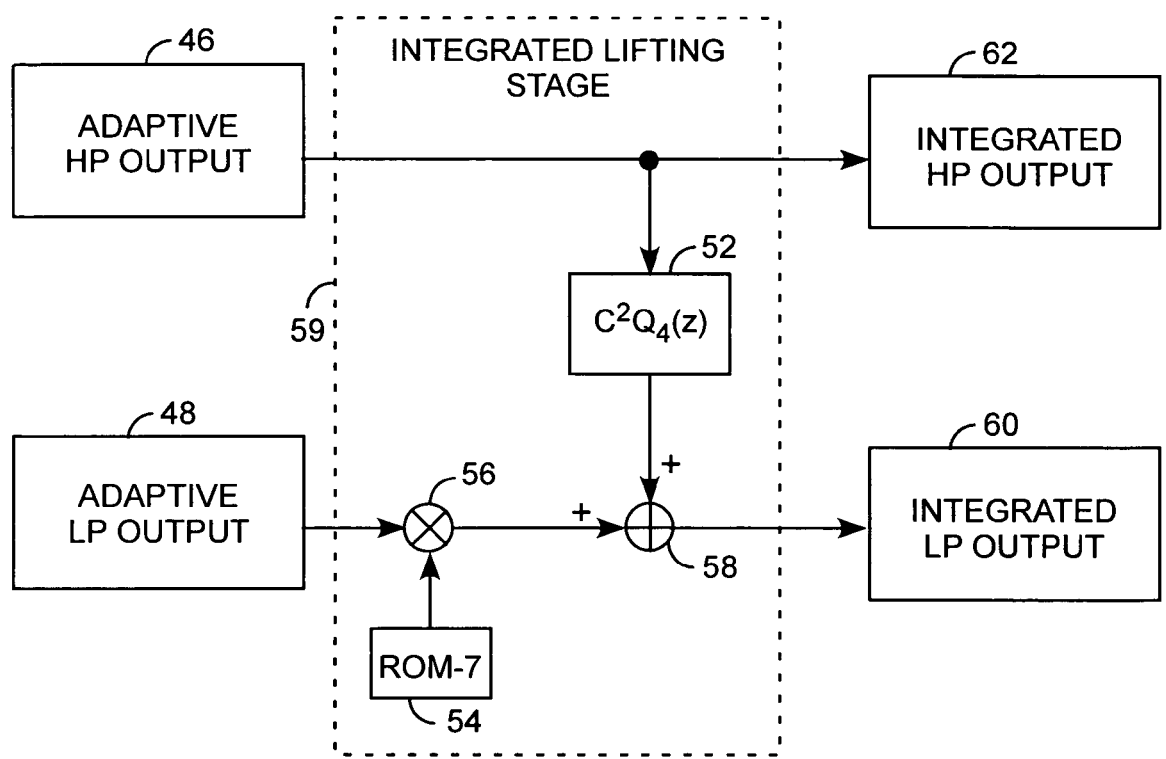
FIG. 6A is a block diagram of an integrated lifting wavelet transform.

Referring to FIG. 6A, the adaptive highpass output from the adaptive HP output buffer 46 and the adaptive lowpass output from the adaptive LP output buffer 48 are input into an integrated lifting stage 59. An integrated lifting wavelet transform is used for transforming an input into an integrated highpass output and an integrated lowpass output. The integrated lifting wavelet transform has an integrated lifting stage 59 that is the next lifting stage following the adaptive lifting stage. The integrated lifting stage processes the adaptive highpass output and the adaptive lowpass output into an integrated highpass output at the integrated HP buffer 62 and an integrated lowpass output at the integrated LP buffer 60. The integrated lifting stage includes an $[C^2Q_4(z)]$ integrated lifting process for processing the adaptive highpass output into an integrated lowpass output. A scalar constant, A, read out from ROM-7 54 scales the adaptive lowpass output from the adaptive LP buffer 48 into a scaled lowpass output. An adder 58 adds the scaled lowpass output and the integrated lifting output into the integrated lowpass output at the integrated LP output buffer 60. The adaptive highpass output from the adaptive HP output buffer 46 is also the integrated highpass output at the integrated HP buffer 62.

The conventional lifting steps of (2+2,2) biorthogonal wavelet transform can be modified into an integrated transform lifting steps. In the initial step the lifting process is to split the input samples x(i) into even numbered and odd numbered samples as denoted by $s^{(0)}(i)$ and $d^{(0)}(i)$ respectively as $s^{(0)}(i)=x(2i)$ and $d^{(0)}(i)=x(2i+1)$. The following first prediction step is to give a new odd numbered sample as $d^{(1)}(i)=d^{(0)}(i)-[(s^{(0)}(i)+s^{(0)}(i+1))/2]$. The next first update step is to calculate an updated even numbered sample as $s^{(1)}(i)=s^{(0)}(i)+[(d^{(1)}(i)+d^{(1)}(i-1))/4]$. The following second prediction step is to give a new odd numbered sample as $d^{(2)}(i)=d^{(1)}(i)-[(s)^{(1)}(i)-s^{(1)}(i-1)+s^{(1)}(i+1)-s^{(1)}(i+2))/16]$. When the second predicted value, $[(s^{(1)}(i)-s^{(1)}(i-1)+s^{(1)}(i+1)-s^{(1)}(i+2)/16]$ is approximated by $[s^{(0)}(i)-s^{(0)}(i-1)+s^{(0)}(i+1)-s^{(0)}(i+2)]/16$, the new odd numbered sample $d^{(2)}(i)$ becomes $[s^{(0)}(i-1)-9s^{(0)}(i)+16x(2i+1)-9s^{(0)}(i+1)+s^{(0)}(i+2)]/16=[x(2i-2)-9x(2i)+16x(2i+1)-9x(2i+2)+x(2i+4)]/16$. The approximated expression of $d^{(2)}(i)$ is the highpass output of the 9/7 biorthogonal wavelet transform $h_1$. Furthermore, the lowpass output of the CDF 9/7 biorthogonal wavelet transform, $h_0$, may be written as $s^{(2)}(i)=x(2i)+[d^{(2)}(i)+d^{(2)}(i-1)]/4=[x(2i-4)-8x(2i-2)+16x(2i-1)+46x(2i)+16x(2i+1)-8x(2i+2)+x(2i+4)]/64$. But x(2i) is closely approximated by $x(2i)=32s^{(1)}(i)/33-8[d^{(2)}(i)+d^{(2)}(i-1)]/33$. Thus the lowpass output of the 9/7 biorthogonal wavelet transform, $h_0$, may be approximately given by the $s^{(2)}(i)$ equation where $s^{(2)}(i)=32s^{(1)}(i)/33+[d^{(2)}(i)+d^{(2)}(i-1)]/132$. For improved performance the second prediction step has been made adaptive as $d^{(2)}(i)=d^{(1)}(i)-P[s^{(1)}(i)]$. For lossy data compression, the last $s^{(2)}(i)$ equation results in a very good approximation of the lowpass output of the lossy CDF 9/7 biorthogonal wavelet transform. For lossless data compression, $s^{(2)}(i)$ takes on the form as $s^{(2)}(i)=s^{(1)}(i)+[(d)^{(2)}(i)+d^{(2)}(i-1))/64]$. The last lossy and lossless lifting steps for $s^{(2)}(i)$ are combined into one expression to get the combined $s^{(2)}(i)$ equation where $s^{(2)}(i)=A*s^{(1)}(i)+[d^{(2)}(i)+d^{(2)}(i-1)/B]$. In the combined $s^{(2)}(i)$ equation, A=32/33 and B=132 are used for lossy data compression, and A=1 and B=64 for lossless data compression.

The integrated lifting wavelet transform comprises of five lifting stages. The first three integer-to-integer lifting stages are the same as the three-stage lifting wavelet transform. The fourth lifting stage is the same adaptive lifting stage. The complete integrated lifting wavelet transform is to integrate the adaptive four-stage lifting wavelet transform with a fifth lifting stage. The fifth lifting stage 59 can be adaptively used for either lossless data compression or lossy data compression. The adaptive highpass output from the adaptive HP output buffer 46 is processed by the $c^2Q_4(Z)$ process in the second update processor 52. The $c^2Q_4(Z)$ process performs the function of $c^2(1+Z)/B$, where the sum of the previous adaptive highpass output sample and the current adaptive highpass output sample is multiplied by $c^2$ and divided by a constant B which is read out from a read-only memory ROM-7 54. The adaptive lowpass output from the adaptive LP output 48 multiplies a constant A being read out from a ROM-7 54 at multiplier 56, and the scaled lowpass output is sent to adder 58 to be added with the second update output. The result from adder 58 is the integrated lowpass output at the integrated LP output buffer 60 and the integrated highpass output at the integrated HP output buffer 62 is the same as the adaptive highpass output from the HP output buffer 46. For lossy data compression, A=32/33 and B=132 are used. For lossless data compression, A=1 and B=64 are used.

Figure 6B:
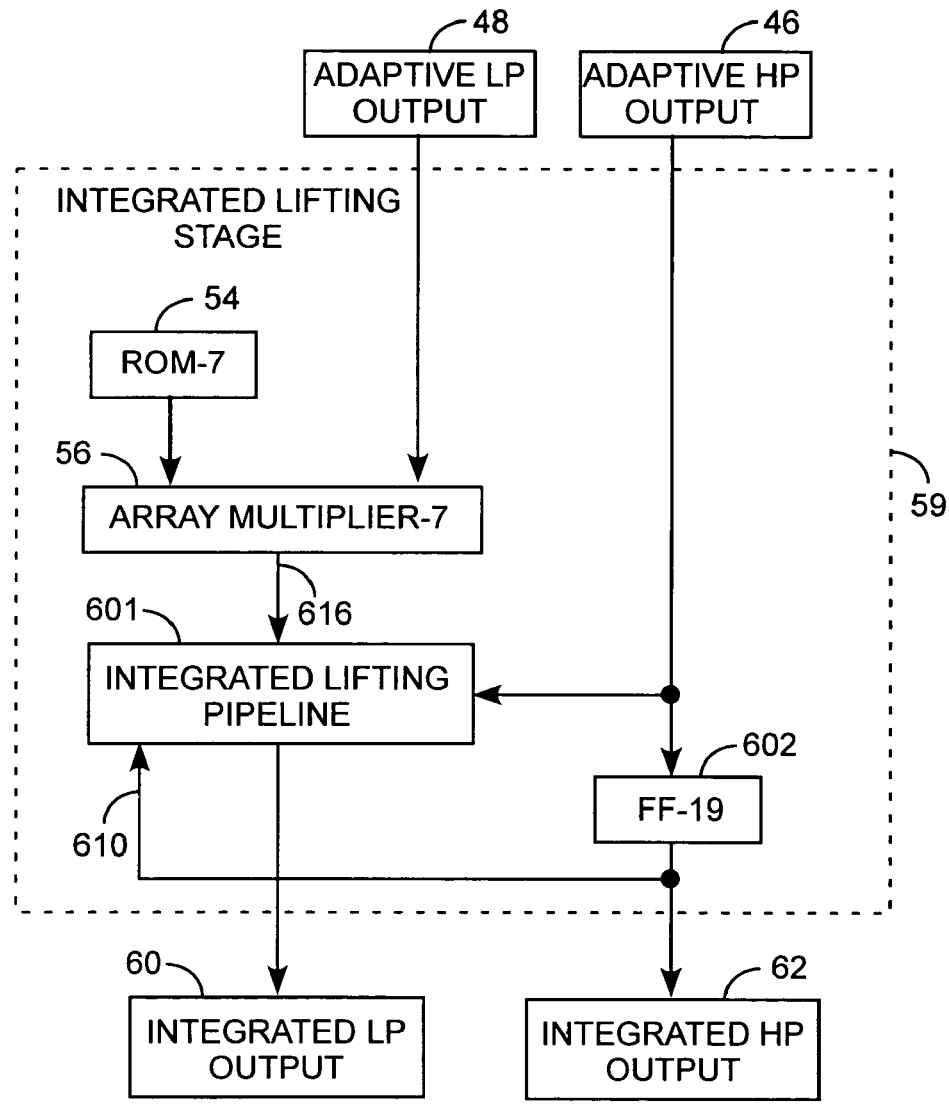
FIG. 6B is a circuit schematic of an integrated stage of a lifting wavelet transform pipeline.

Referring to FIG. 6B, the implementation of the integrated lifting stage 59 comprises of an array multiplier-7 56, a read only memory ROM-7 54, an integrated lifting pipeline 601, and a flip-flop FF-19. The adaptive LP output buffer 48, the ROM-7 54, the array multiplier AM-2 56, and the integrated LP output buffer 60, are all enabled at odd-numbered clock edges. The adaptive HP output buffer 46, the integrated HP output buffer 62, and the flip-flop FF-19 602, are all enabled at even-numbered clock edges. The multiplying constant A is stored in ROM-7 54 in canonic signed digital codes. In word serial and bit parallel format, the adaptive LP output data from the adaptive LP output buffer 48 and the canonic signed digital codes of A from ROM-7 54 are multiplied together in the array multiplier-7 56. The multiplication result in two's complement is input to the integrated lifting pipeline 601 during odd-numbered clock phases. In the same data format the output from the integrated lifting pipeline 601 is stored in the integrated LP output buffer 60. Two consecutive data words flowing out from the adaptive HP output buffer 46 are input to the integrated lifting pipeline 601 during even-numbered clock phases. The two consecutive words are output from the adaptive HP output buffer 46 and the output from flip-flop FF-19 610. The data from the adaptive HP output buffer 46 after passing through the flip-flop FF-19 602 is input to the integrated HP output buffer 62 during even-numbered clock phases.

Figure 6C:
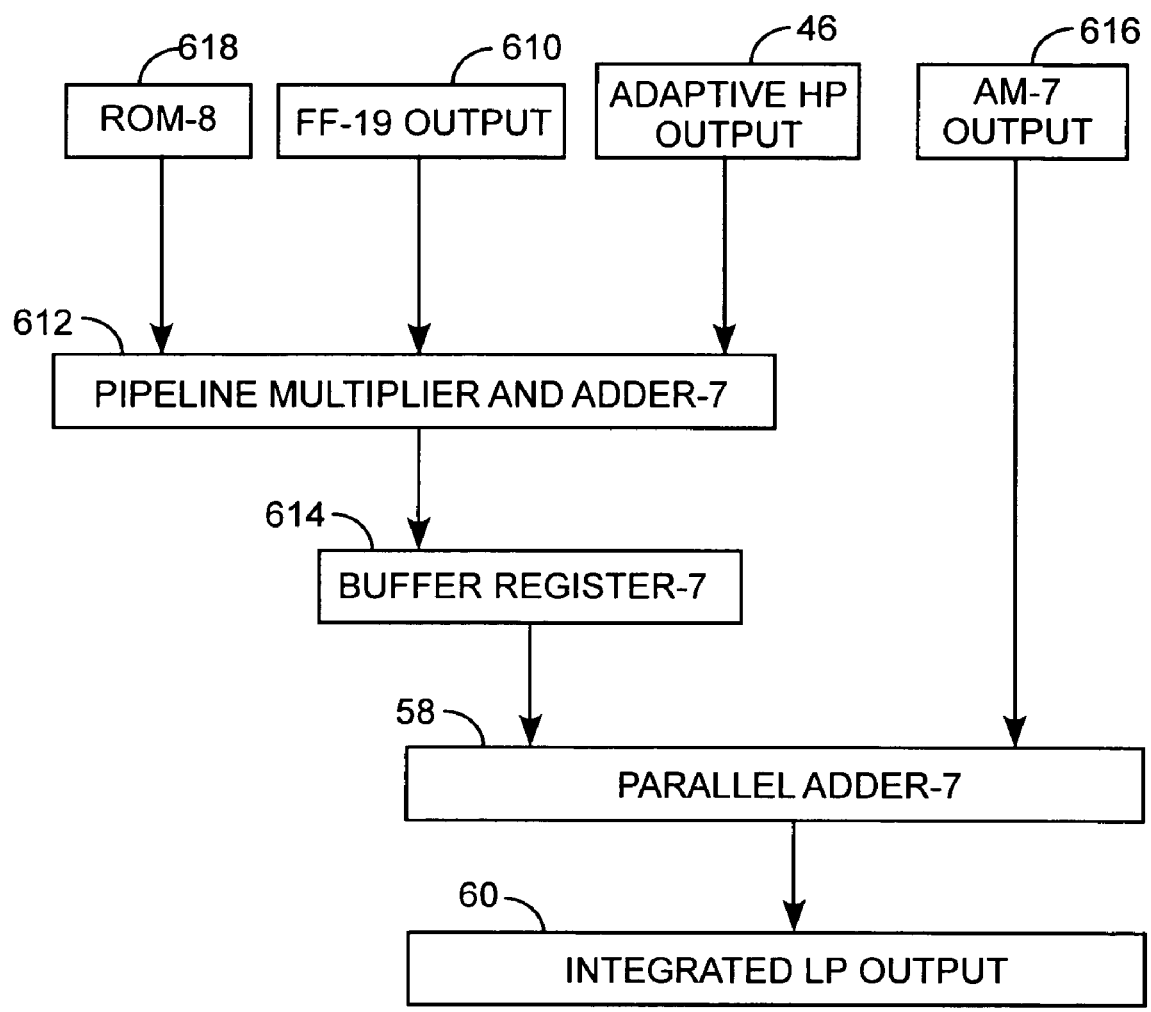
FIG. 6C is a circuit schematic of the integrated lifting stage pipeline.

Referring to FIG. 6C, the array multiplier-7 (AM-7) output buffer 616, the parallel adder-7 58, and the integrated LP output buffer 60, are all operating in odd-numbered clock phases. The FF-19 output buffer 610, the read-only memory (ROM-8) 618, the adaptive HP output buffer 46, and the pipeline multiplier and adder unit-7 (PMA-7) 612, are all operating in even-numbered clock phases. The multiplying constant (1/B) is stored in ROM-8 618 in canonic signed digital codes. In two's complement, the FF-19 output data from the FF-19 output buffer 610 and the adaptive HP output data from the adaptive HP Output buffer 46 are added together in PMA-7 612. In the same PMA-7 the summation result is multiplied to the canonic signed digital codes of (1/B) from ROM-8 618 at even-numbered clock phases. The multiplication result is latched on by the buffer register-7 614 at even-numbered clock edges, but piped out at odd-numbered clock edges. Being operated in odd-numbered clock phases, parallel adder-7 sums the array multiplier-7 output data from the AM-7 output buffer 616 and the output data from buffer register-7 614 together, then pipes out the summation result at odd-numbered clock edges to the integrated LP output buffer 60.

In terms of the Peak Signal to Noise Ratio (PSNR) as a measure of decompressed image quality in lossy image data compression, the results of lossy compression using the integrated lifting wavelet transform are listed in the PSNR of Integrated Lifting of 8-bit Images Table.

PSNR of Integrated Lifting of 8-bit Images Table

| | Bit-Rate | | | |
|---|---|---|---|---|
| | 0.4 bpp | 0.6 bpp | 0.8 bpp | 1.0 bpp |
| Barb1 | 30.18 | 32.93 | 35.06 | 37.09 |
| Goldhill | 31.94 | 33.75 | 35.07 | 36.46 |
| Lena | 35.69 | 37.54 | 38.81 | 39.89 |

For lossless data compression, for which A=1 and B=64, the PSNR values are slightly better than those obtained from the adaptive four-stage lifting wavelet transform. The integrated lifting wavelet transform is advantageously used to perform both lossy and lossless data compression. The integrated lifting wavelet transform including the adaptive lifting feature outperforms any other lifting methods for lossless data compression. Thus the integrated lifting wavelet transform offers not only functional flexibility but also better performance. Those skilled in the art can make enhancements, improvements, and modifications to the invention, and these enhancements, improvements, and modifications may nonetheless fall within the spirit and scope of the following claims.

What is claimed is:

1. A lifting wavelet transform for transforming an input into an integrated highpass output and an integrated lowpass output, the lifting wavelet transform comprising,
    a four lifting stage wavelet transform for transforming the input into a fourth highpass output and an fourth lowpass output, and,
    an integrated lifting stage for processing the fourth highpass output and the fourth lowpass output into the integrated highpass output and the integrated lowpass output, the integrated lifting stage comprising a $[C^2Q_4(z)]$ integrated process for processing the fourth highpass output into an integrated output, and comprising an adder for adding the fourth lowpass output and the integrated output for providing the integrated lowpass output, the fourth highpass output being the integrated highpass output, where C is a scaler, $Q_4$ is a linear polynomial, and z is a time index.

2. The transform of claim 1 wherein,
    the four lifting stage wavelet transform comprises three lifting stages and an adaptive predictor stage,
    the fourth highpass output is an adaptive highpass output, and
    the fourth lowpass output is an adaptive lowpass output.

3. The transform of claim 1 wherein,
    the four lifting stage transforms are four lifting stages providing lossless compression of the input at the fourth highpass and fourth lowpass outputs.

4. The transform of claim 1 further comprising,
    a scalar for scaling the fourth lowpass output prior to adding by the adder.

5. The transform of claim 1 further comprising,
    a scalar for scaling the fourth lowpass output prior to adding by the adder, the fourth highpass output and fourth lowpass output provide lossy compressed data of the input, the integrated highpass output and integrated lowpass output are lossy when the scalar is not equal to one.

6. The transform of claim 1 further comprising,
    a scalar for scaling the fourth lowpass output prior to adding by the adder, the fourth highpass output and fourth lowpass output provide lossless compressed data of the input, the integrated highpass output and integrated lowpass output are lossless when the scalar is equal to one.

7. The transform of claim 1 further comprising,
    a scalar for scaling the fourth lowpass output prior to adding by the adder, the fourth highpass output and fourth lowpass output provide lossless compressed data of the input, the integrated highpass output and integrated lowpass output are lossy compressed data of an image of the input.

* * * * *